US012793727B2

(12) United States Patent
Vondersaar et al.

(10) Patent No.: US 12,793,727 B2
(45) Date of Patent: Nov. 10, 2026

(54) METHOD AND APPARATUS FOR IMPROVED SPEAKER IDENTIFICATION AND SPEECH ENHANCEMENT

(71) Applicant: MAGIC LEAP, INC., Plantation, FL (US)

(72) Inventors: Benjamin Thomas Vondersaar, Indianapolis, IN (US); Remi Samuel Audfray, San Francisco, CA (US)

(73) Assignee: MAGIC LEAP, INC., Plantation, FL (US)

( * ) Notice: Subject to any disclaimer, the term of this patent is extended or adjusted under 35 U.S.C. 154(b) by 245 days.

(21) Appl. No.: 18/282,115

(22) PCT Filed: Mar. 18, 2022

(86) PCT No.: PCT/US2022/071213

§ 371 (c)(1),
(2) Date: Sep. 14, 2023

(87) PCT Pub. No.: WO2022/198234

PCT Pub. Date: Sep. 22, 2022

(65) Prior Publication Data

US 2024/0153518 A1 May 9, 2024

Related U.S. Application Data

(60) Provisional application No. 63/162,782, filed on Mar. 18, 2021.

(51) Int. Cl.
*G10L 21/0208* (2013.01)
*G10L 21/028* (2013.01)
(Continued)

(52) U.S. Cl.
CPC ........ *G10L 21/0208* (2013.01); *G10L 21/028* (2013.01); *G10L 25/51* (2013.01);
(Continued)

(58) Field of Classification Search
CPC ..... G10L 21/0208; G10L 25/51; G10L 25/72; G10L 2021/02087; G10L 15/24;
(Continued)

(56) References Cited

U.S. PATENT DOCUMENTS 8,930,195 B1 1/2015 Lebeau et al.
2011/0026722 A1* 2/2011 Jing ........................ G10L 25/84 381/71.1

(Continued)

FOREIGN PATENT DOCUMENTS

JP H04 245720 9/1992

OTHER PUBLICATIONS

Foreign Response for EP Patent Appln. No. 22772387.1 dated Apr. 1, 2025.

(Continued)

*Primary Examiner* — Vivian C Chin
*Assistant Examiner* — Annabelle Kang
(74) *Attorney, Agent, or Firm* — Vista IP Law Group, LLP

(57) ABSTRACT

A headwear device comprises a frame structure configured for being worn on the head of a user, a vibration voice pickup (VVPU) sensor affixed to the frame structure for capturing vibration originating from a voiced sound of a user and generating a vibration signal, at least one microphone affixed to the frame structure for capturing voiced sound from the user and ambient noise, and at least one processor configured for performing an analysis of the vibration signal, and determining that the user has generated the voice sound based on the analysis of the vibration signal.

20 Claims, 14 Drawing Sheets

(51) Int. Cl.

| | |
|---|---|
| ***G10L 25/51*** | (2013.01) |
| ***G10L 25/72*** | (2013.01) |
| ***H04R 1/08*** | (2006.01) |
| ***H04R 1/10*** | (2026.01) |

(52) U.S. Cl.
CPC ................ *G10L 25/72* (2013.01); *H04R 1/08* (2013.01); *H04R 1/1075* (2013.01); *G10L 2021/02087* (2013.01); *H04R 2499/15* (2013.01)

(58) Field of Classification Search
CPC ........... G10L 2025/783; G10L 21/0272; G10L 25/78; H04R 1/1075; H04R 2499/15; H04R 1/406; H04R 3/005; H04R 1/1083
See application file for complete search history.

(56) References Cited

U.S. PATENT DOCUMENTS

| | | | |
|---|---|---|---|
| 2012/0278070 | A1 | 11/2012 | Herve et al. |
| 2013/0080168 | A1 | 3/2013 | Iida et al. |
| 2014/0188467 | A1 | 7/2014 | Jing et al. |
| 2019/0295554 | A1 | 9/2019 | Lesso |
| 2020/0135230 | A1 | 4/2020 | Tong et al. |

OTHER PUBLICATIONS

Partial European Search Report for EP Patent Appln. No. 22772387.1 dated Jun. 17, 2024.

Extended European Search Report for EP Patent Appln. No. 22772387.1 dated Sep. 13, 2024.

Zhang Shiming et al: "Fundamental frequency estimation combining air-conducted speech with bone-conducted speech in noisy environment", 2017 International Conference on Electrical, Computer and Communication Engineering (ECCE), IEEE, Feb. 16, 2017 (Feb. 16, 2017), pp. 244-247, XP033089379, DOI: 10.1109/ECACE.2017.7912912 [retrieved on Apr. 26, 2017].

PCT International Search Report and Written Opinion Appln. No. PCT/US2022/071213, Applicant Magic Leap, Inc., dated Jun. 3, 2022.

Foreign Exam Report for EP Patent Appln. No. 22772387.1 dated Aug. 11, 2025.

Foreign Response for EP Patent Appln. No. 22772387.1 dated Dec. 10, 2025.

* cited by examiner

METHOD AND APPARATUS FOR IMPROVED SPEAKER IDENTIFICATION AND SPEECH ENHANCEMENT

RELATED APPLICATION DATA

This application claims priority to PCT Application No. PCT/US2022/071213, filed on Mar. 18, 2022, which claims priority to U.S. Provisional Application Ser. No. 63/162,782, filed Mar. 18, 2021. The contents of the above-mentioned patent applications are hereby expressly incorporated herein by reference.

TECHNICAL FIELD

This disclosure generally relates to eyewear devices and, more particularly, to improved designs of eyewear devices that include optics and/or electronics having one or more audio sensors (e.g., a microphone) for capturing sounds.

BACKGROUND

Recently, smart eyewear devices having optics and/or electronics (e.g., spatial computing headsets, virtual reality (VR) headsets, augmented reality (AR) headsets, mixed reality (MR) headsets, and extended reality (XR) headsets, or other smart eyewear devices) have become popular. Smart eyewear devices may be used, not only for gaming purposes, but also for other purposes, such as multimedia entertainment, productivity, etc. These smart eyewear devices have been adapted to capture speech or other sounds via one or more integrated or remotely attached audio sensors (e.g., a microphone) to provide voice communications or voice commands. When using smart eyewear devices, the user may have the option of using a speakerphone mode or a wired headset to receive his speech. A common issue with these hands-free modes of operation is that the speech captured by the audio sensors may contain unintended environmental noise, such as wind noise, other persons in the background, or other types of ambient noises. This environmental noise often renders the user's speech unintelligible, and thus, degrades the quality of the voice communication or voice command, as well as the overall user experience and usefulness of the smart eyewear devices.

Some smart eyewear devices may include microphone arrays that employ beamforming or spatial filtering techniques for directional signal reception towards the mouth of the user, such that sounds originating from the user are preferentially detected. However, even when equipped with such beamforming or spatial filtering techniques, unintended environmental noise, including sound from other speakers, may still be picked up by the microphone arrays. Adaptive filtering, such as noise cancellation, may be employed by smart eyewear device to substantially eliminated the untended environmental noise. However, the use of adaptive filtering is computationally expensive, and thus, may be prohibitive in smart eyewear devices, which by their very nature, have limited computational resources and battery life for supporting such computational resources. Furthermore, smart eyewear devices that employ adaptive filtering may still face challenges when it comes to distinguishing between desirable sounds from the user that happen to fall within frequency ranges typical of unwanted sounds (e.g., low frequency ranges).

Therefore, there is a need for an eyewear device with improved speaker identification and speech enhancement to address at least the aforementioned shortcomings, challenges, and problems with conventional eyewear devices.

SUMMARY

In accordance with a first aspect of the present inventions, a user speech subsystem comprises a vibration voice pickup (VVPU) sensor configured for capturing vibration originating from a voiced sound of a user and generating a vibration signal. The user speech subsystem further comprises at least one processor configured for acquiring the vibration signal, acquiring an audio signal output by at least one microphone in response to capturing voiced sound from the user and ambient noise, performing an analysis of the vibration signal, and determining that the at least one microphone has captured the voiced sound of the user based on the analysis of the vibration signal. The user speech subsystem may further comprise a speech recognition engine configured for interpreting voiced sound of the user in the audio signal into speech.

In one embodiment, the analysis of the vibration signal comprises determining that one or more characteristics of the vibration signal exceeds a threshold level. In another embodiment, the processor(s) is further configured for performing an analysis of the audio signal, and determining that the microphone(s) has captured voiced sound from the user based on the analyses of the audio signal and the vibration signal. For example, performing the analyses of the audio signal and the vibration signal may comprise determining a relationship between the audio signal and the vibration signal. Determining relationship between the audio signal and the vibration signal may comprise determining a correlation between the audio signal and the vibration signal, e.g., by generating spectra of frequencies for each of the audio signal and the vibration signal, in which case, the determined correlation may be between the frequencies of the spectra of the audio signal and the vibration signal. In still another embodiment, the ambient noise contains voiced sound from others, in which case, the processor(s) may be further configured for discriminating between voiced sound of the user in the audio signal and voiced sound from others in the audio signal.

In yet another embodiment, the processor(s) is further configured for enhancing the voiced sound of the user in the audio signal. Such enhancement of the voiced sound of the user in the audio signal may be performed in response to the determination that the microphone(s) has captured the voiced sound of the user. In this embodiment, the processor(s) may be further configured for determining a noise level of the audio signal, comparing the determined noise level to a threshold limit, and enhancing the voiced sound of the user in the audio signal when the determined noise level is greater than the threshold limit. In this embodiment, the processor(s) may be further configured for using the vibration signal to enhance the voiced sound of the user in the audio signal. For example, at least a portion of the vibration signal can be combined with the audio signal, e.g., by spectrally mixing the digital audio signal and the digital vibration signal. As another example, a pitch of the voiced sound of the user can be estimated from the digital vibration signal, and the estimated pitch can be used to enhance the voiced sound of the user in the audio signal.

In accordance with a second aspect of the present inventions, a method comprises capturing vibration originating from a voiced sound of a user, generating a vibration signal in response to capturing the vibration originating from the voice sound of the user, capturing the voiced sound of the user and ambient noise, generating an audio signal in response to capturing the voiced sound of the user and the ambient noise, and performing an analysis of the vibration signal. The method further comprises determining that the audio signal contains the voiced sound of the user based on the analysis of the vibration signal. The method may further comprise interpreting voiced sound of the user in the audio signal into speech.

In one method, the analysis of the vibration signal comprises determining that one or more characteristics of the vibration signal exceeds a threshold level. Another method further comprises performing an analysis of the audio signal, in which case, that the determination that the audio signal contains the voiced sound of the user may be based on the analyses of the audio signal and the vibration signal. For example, performing the analyses of the audio signal and the vibration signal may comprise determining a relationship between the audio signal and the vibration signal. Determining relationship between the audio signal and the vibration signal may comprise determining a correlation between the audio signal and the vibration signal, e.g., by generating spectra of frequencies for each of the audio signal and the vibration signal, in which case, the determined correlation may be between the frequencies of the spectra of the audio signal and the vibration signal. In still another method, the ambient noise contains voiced sound from others, in which case, the method may further comprise discriminating between voiced sound of the user in the audio signal and voiced sound from others in the audio signal.

Yet another method further comprises enhancing the voiced sound of the user in the audio signal. Such enhancement of the voiced sound of the user in the audio signal may be in response to the determination that the audio signal contains voiced sound of the user. This method may further comprise determining a noise level of the audio signal, comparing the determined noise level to a threshold limit, and enhancing the voiced sound of the user in the audio signal when the determined noise level is greater than the threshold limit. This method may further comprise using the vibration signal to enhance the voiced sound of the user in the audio signal. For example, at least a portion of the vibration signal can be combined with the audio signal, e.g., by spectrally mixing the digital audio signal and the digital vibration signal. As another example, a pitch of the voiced sound of the user can be estimated from the digital vibration signal, and the estimated pitch can be used to enhance the voiced sound of the user in the audio signal.

In accordance with a third aspect of the present inventions, a user speech subsystem comprises a vibration voice pickup (VVPU) sensor configured for capturing vibration originating from a voiced sound of a user and generating a vibration signal. The user speech subsystem further comprises at least one processor configured for acquiring the vibration signal, acquiring an audio signal output by at least one microphone in response to capturing voiced sound from the user and ambient noise, and using the vibration signal to enhance the voiced sound of the user in the audio signal. For example, at least a portion of the vibration signal can be combined with the audio signal, e.g., by spectrally mixing the digital audio signal and the digital vibration signal. As another example, a pitch of the voiced sound of the user can be estimated from the digital vibration signal, and the estimated pitch can be used to enhance the voiced sound of the user in the audio signal.

The user speech subsystem may further comprise a speech recognition engine configured for interpreting voiced sound of the user in the audio signal into speech. In one embodiment, the processor(s) is further configured for determining that the microphone(s) has captured the voiced sound of the user based on the analysis of the vibration signal, and enhancing the voiced sound of the user in the audio signal in response to the determination that the microphone(s) has captured the voiced sound of the user. In another embodiment, the processor(s) may be further configured for determining a noise level of the audio signal, comparing the determined noise level to a threshold limit, and enhancing the voiced sound of the user in the audio signal when the determined noise level is greater than the threshold limit.

In accordance with a fourth aspect of the present inventions, a method comprises capturing vibration originating from a voiced sound of a user, generating a vibration signal in response to capturing the vibration originating from the voice sound of the user, capturing the voiced sound of the user and ambient noise, generating an audio signal in response to capturing the voiced sound of the user and the ambient noise, and using the vibration signal to enhance the voiced sound of the user in the audio signal. For example, at least a portion of the vibration signal can be combined with the audio signal, e.g., by spectrally mixing the digital audio signal and the digital vibration signal. As another example, a pitch of the voiced sound of the user can be estimated from the digital vibration signal, and the estimated pitch can be used to enhance the voiced sound of the user in the audio signal.

The method may further comprise interpreting the enhanced voiced sound of the user in the audio signal into speech. One method further comprises performing an analysis of the vibration signal, determining that the user has generated voiced sound based on the analysis of the vibration signal, and enhancing the voiced sound of the user in the audio signal in response to the determination that the user has generated voiced sound. Another method further comprises determining a noise level of the audio signal, comparing the determined noise level to a threshold limit, and enhancing the voiced sound of the user in the audio signal when the determined noise level is greater than the threshold limit.

In accordance with a fifth aspect of the present inventions, a user speech subsystem comprises a vibration voice pickup (VVPU) sensor configured for capturing vibration originating from a voiced sound of a user and generating a vibration signal. The user speech subsystem further comprises at least one processor configured for acquiring the vibration signal, performing an analysis of the vibration signal, determining that the user is generating a voiced sound based on the analysis, and activating at least one microphone to capture the voiced sound of the user and output an audio signal in response to the determination that the user is generating the voiced sound, and acquiring the audio signal. The user speech subsystem may further comprise a speech recognition engine configured for interpreting voiced sound of the user in the audio signal into speech.

In one embodiment, the analysis of the vibration signal comprises determining that one or more characteristics of the vibration signal exceeds a threshold level. In another embodiment, the ambient noise contains voiced sound from others, in which case, the processor(s) may be further configured for discriminating between voiced sound of the user in the audio signal and voiced sound from others in the audio signal. In still another embodiment, the processor(s) is further configured for enhancing the voiced sound of the user in the audio signal. Such enhancement of the voiced sound of the user in the audio signal may be performed in response to the determination that the microphone(s) has captured the voiced sound of the user. In this embodiment, the processor(s) may be further configured for determining a noise level of the audio signal, comparing the determined noise level to a threshold limit, and enhancing the voiced sound of the user in the audio signal when the determined noise level is greater than the threshold limit. In yet another embodiment, the processor(s) may be further configured for using the vibration signal to enhance the voiced sound of the user in the audio signal. For example, at least a portion of the vibration signal can be combined with the audio signal, e.g., by spectrally mixing the digital audio signal and the digital vibration signal. As another example, a pitch of the voiced sound of the user can be estimated from the digital vibration signal, and the estimated pitch can be used to enhance the voiced sound of the user in the audio signal.

In accordance with a sixth aspect of the present inventions, capturing vibration originating from a voiced sound of a user, generating a vibration signal in response to capturing the vibration originating from the voice sound of the user, performing an analysis of the vibration signal, and determining that the user has generated voiced sound based on the analysis of the vibration signal. The method further comprises capturing the voiced sound of the user in response to the determination that the user is generating voiced sound, and generating an audio signal in response to capturing the voiced sound of the user.

The method may further comprise interpreting the enhanced voiced sound of the user in the audio signal into speech. In one method, the analysis of the vibration signal comprises determining that one or more characteristics of the vibration signal exceeds a threshold level. In another method, the ambient noise contains voiced sound from others, in which case, the method may further comprise discriminating between voiced sound of the user in the audio signal and voiced sound from others in the audio signal. Still another method further comprises enhancing the voiced sound of the user in the audio signal. Such enhancement of the voiced sound of the user in the audio signal may be in response to the determination that the audio signal contains voiced sound of the user. This method may further comprise determining a noise level of the audio signal, comparing the determined noise level to a threshold limit, and enhancing the voiced sound of the user in the audio signal when the determined noise level is greater than the threshold limit. This method may further comprise using the vibration signal to enhance the voiced sound of the user in the audio signal. For example, at least a portion of the vibration signal can be combined with the audio signal, e.g., by spectrally mixing the digital audio signal and the digital vibration signal. As another example, a pitch of the voiced sound of the user can be estimated from the digital vibration signal, and the estimated pitch can be used to enhance the voiced sound of the user in the audio signal.

In accordance with a seventh aspect of the present inventions, a user speech subsystem comprises a vibration voice pickup (VVPU) sensor configured for capturing vibration originating from a voiced sound of a user and generating a vibration signal. The user speech subsystem further comprises at least one processor configured for acquiring the vibration signal, acquiring an audio signal output by at least one microphone in response to capturing voiced sound from the user and ambient noise containing voiced sound of others, and using the vibration signal to discriminate between voiced sound of the user and the voiced sound from others in the audio signal captured by the at least one microphone.

In one embodiment, the processor(s) is further configured for performing an analysis of the vibration signal, and determining that the microphone(s) has captured the voiced sound of the user based on the analysis of the vibration signal, and discriminating between voiced sound of the user in the audio signal and voiced sound from others captured by the microphone(s) in response to the determination that the microphone(s) has captured the voiced sound of the user. In another embodiment, the processor(s) is further configured for discriminating between voiced sound of the user and voiced sound from others captured by the microphone(s) by detecting voice activity in the audio signal, generating a voice stream corresponding to the voiced sound of the user and the voiced sound of others, and discriminating between the voiced sound of the user and the voiced sound of the others in the voice stream. In still another embodiment, the processor(s) is further configured for outputting a voice stream corresponding to the voiced sound of the user, and outputting a voice stream corresponding to the voiced sound of the others. In yet another embodiment, the user speech subsystem further comprises a speech recognition engine configured for interpreting the enhanced voiced sound of the user in the voice stream into speech.

In accordance with an eighth aspect of the present inventions, a method comprises capturing vibration originating from a voiced sound of a user, generating a vibration signal in response to capturing the vibration originating from the voice sound of the user, capturing the voiced sound of the user and ambient noise, generating an audio signal in response to capturing the voiced sound of the user and the ambient noise, and using the vibration signal to discriminate between voiced sound of the user in the audio signal and voiced sound from others in the audio signal.

One method further comprises performing an analysis of the vibration signal, determining that the user has generated voiced sound based on the analysis of the vibration signal, and discriminating between the voiced sound of the user in the audio signal and voiced sound from others in the audio signal in response to the determination that the user has generated voiced sound. In another method, discriminating between the voiced sound of the user in the audio signal and voiced sound from others in the audio signal comprises detecting voice activity in the audio signal, generating a voice stream corresponding to the voiced sound of the user and the voiced sound of others, and discriminating between the voiced sound of the user and the voiced sound of the others in the voice stream. Still another method further comprises outputting a voice stream corresponding to the voiced sound of the user, and outputting a voice stream corresponding to the voiced sound of the others. Yet another method further comprises interpreting the enhanced voiced sound of the user in the voice stream into speech.

In accordance with a ninth aspect of the present inventions, a headwear device comprises a frame structure configured for being worn on the head of a user, and a vibration voice pickup (VVPU) sensor affixed to the frame structure for capturing vibration originating from a voiced sound of a user and generating a vibration signal. In one embodiment, the VVPU is further configured for being vibrationally coupled to one of a nose, an eyebrow, and a temple of the user when the frame structure is worn by the user. In another embodiment, the frame structure comprises a nose pad in which the VVPU sensor is affixed. The headwear device further comprises at least one microphone affixed to the frame structure for capturing voiced sound from the user and ambient noise. The headwear device further comprises at least one processor configured for performing an analysis of the vibration signal, and determining that the user has generated the voice sound based on the analysis of the vibration signal. The headwear device may further comprise a speech recognition engine configured for interpreting voiced sound of the user in the audio signal into speech.

In one embodiment, the analysis of the vibration signal comprises determining that one or more characteristics of the vibration signal exceeds a threshold level. In another embodiment, the processor(s) is further configured for performing an analysis of the audio signal, and determining that the microphone(s) has captured voiced sound from the user based on the analyses of the audio signal and the vibration signal. For example, performing the analyses of the audio signal and the vibration signal may comprise determining a relationship between the audio signal and the vibration signal. Determining relationship between the audio signal and the vibration signal may comprise determining a correlation between the audio signal and the vibration signal, e.g., by generating spectra of frequencies for each of the audio signal and the vibration signal, in which case, the determined correlation may be between the frequencies of the spectra of the audio signal and the vibration signal. In still another embodiment, the ambient noise contains voiced sound from others, in which case, the processor(s) may be further configured for discriminating between voiced sound of the user in the audio signal and voiced sound from others in the audio signal.

In yet another embodiment, the processor(s) is further configured for enhancing the voiced sound of the user in the audio signal. Such enhancement of the voiced sound of the user in the audio signal may be performed in response to the determination that the microphone(s) has captured the voiced sound of the user. In this embodiment, the processor(s) may be further configured for determining a noise level of the audio signal, comparing the determined noise level to a threshold limit, and enhancing the voiced sound of the user in the audio signal when the determined noise level is greater than the threshold limit. In this embodiment, the processor(s) may be further configured for using the vibration signal to enhance the voiced sound of the user in the audio signal. For example, at least a portion of the vibration signal can be combined with the audio signal, e.g., by spectrally mixing the digital audio signal and the digital vibration signal. As another example, a pitch of the voiced sound of the user can be estimated from the digital vibration signal, and the estimated pitch can be used to enhance the voiced sound of the user in the audio signal. In yet another embodiment, the headwear device further comprises at least one speaker affixed to the frame structure for conveying sound to the user, and at least one display screen and at least one projection assembly affixed to the frame structure for projecting virtual content onto the at least one display screen for viewing by the user.

Other and further aspects and features of the invention will be evident from reading the following detailed description of the preferred embodiments, which are intended to illustrate, not limit, the invention.

BRIEF DESCRIPTION OF DRAWINGS

The drawings illustrate the design and utility of embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
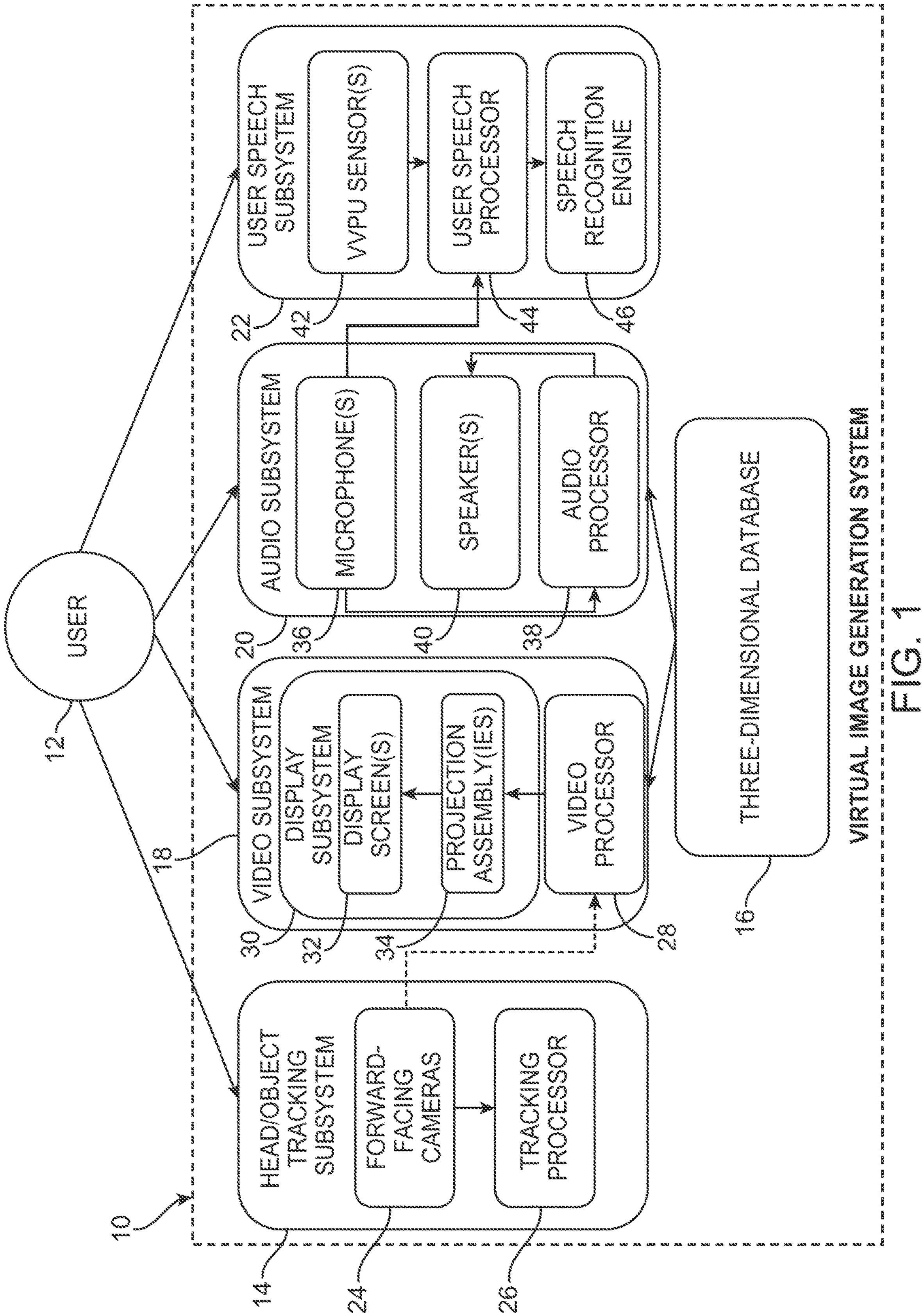
FIG. 1 is a block diagram of one embodiment of a virtual image generation system constructed in accordance with the present inventions.

Referring first to FIG. 1, one embodiment of a virtual image generation system 10 constructed in accordance with the present inventions will now be described. It should be appreciated that the virtual image generation system 10 can be any wearable system that displays at least virtual content to a user 12, including, but not limited to, virtual reality (VR), augmented reality (AR), mixed reality (MR), and extended reality (XR) systems. Significantly, as will be described in further detail below, the virtual image generation system 10 is configured for capturing, identifying, and enhancing speech from the user 12 in a noisy ambient environment.

The virtual image generation system 10 comprises a head/object tracking subsystem 14 configured for tracking the position and orientation of the head of the user 12 relative to a virtual three-dimensional scene, as well as tracking the position and orientation of real objects relative to the head of the end user 12; a three-dimensional database 16 configured for storing a virtual three-dimensional scene; a video subsystem 18 configured for presenting virtual content to the user 12; an audio subsystem 20 configured for presenting actual or virtual sound to the user 12; and a user speech subsystem 22 configured for identifying and enhancing voiced sound originating from the user 12 in a noisy ambient environment (e.g., wind noise, other persons in the background and interpreting the voiced sound of the user into speech, e.g., commands issued by the user 12.

The head/object tracking subsystem 14 comprises one or more sensors 24 configured for collecting head pose data (position and orientation) of the user 12, and a tracking processor 26 configured for determining the head pose of the user 12 in a known coordinate system based on the head pose data collected by the sensor(s) 24. The sensor(s) 24 may include one or more of image capture devices (such as visible and infrared light cameras), inertial measurement units (including accelerometers and gyroscopes), compasses, microphones, GPS units, or radio devices. In the illustrated embodiment, the sensor(s) 24 comprises head-worn forward-facing camera(s). When head worn in this manner, the forward-facing camera(s) 24 is particularly suited to capture information indicative of distance and angular position (i.e., the direction in which the head is pointed) of the head of the user 12 with respect to the environment in which the user 12 is located. Head orientation may be detected in any direction (e.g., up/down, left, right with respect to the reference frame of the user 12).

The three-dimensional database 16 is configured for storing a virtual three-dimensional scene, which comprises virtual objects (both content data of the virtual objects, as well as absolute meta data associated with these virtual objects, e.g., the absolute position and orientation of these virtual objects in the 3D scene) and virtual objects (both content data of the virtual objects, as well as absolute meta data associated with these virtual objects, e.g., the volume and absolute position and orientation of these virtual objects in the 3D scene, as well as space acoustics surrounding each virtual object, including any virtual or real objects in the vicinity of the virtual source, room dimensions, wall/floor materials, etc.). The three-dimensional database 16 is also configured for storing audio content and meta data associated with the virtual objects.

The video subsystem 18 comprises a video processor 28 and a display subsystem 30.

The video processor 28 is configured for acquiring the video content and absolute meta data associated with the virtual objects from the three-dimensional database 16 and acquiring head pose data of the user 12 (which will be used to localize the absolute meta data for the video to the head of the user 12 from the head/object tracking subsystem 14, and rendering video therefrom, which is then conveyed to the display subsystem 30 for transformation into images that are intermixed with images originating from real objects in the ambient environment in the field of view of the user 12. In an alternative embodiment, the video processor 28 may also be configured for acquiring video data originating from real objects of the ambient environment from the forward-facing camera(s) 24 to facilitate the display of real content in addition to the presentation of virtual content by the video subsystem 16 to the user 12.

The display subsystem 30 comprises one or more display screens 32 and one or more projection assemblies 34 that project the virtual content acquired by the video processor 28 respectively onto the display screen(s) 32.

In one embodiment, the display screen(s) 32 are partially transparent display screens through which real objects in the ambient environment can be seen by the user 12 and onto which the virtual content may be displayed by the projection assembly(ies) 34. The projection assembly(ies) 34 provide scanned light respectively to the partially transparent display screen(s) 32. For example, each of the projection assembly (ies) 34 may take the form of an optical fiber scan-based projection device (which may include any arrangement of lens, waveguides, diffractive elements, projection fibers, light sources, driver electronics, etc. for presenting the scanned light to the user 12), and each of the display screen(s) 32 may take the form of a waveguide-based display into which the scanned light from the respective projection assembly(ies) 34 is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. In the alternative embodiment where the video processor 28 is configured for acquiring video data originating from real objects of the ambient environment from the forward-facing camera(s) 24, the display screen(s) 32 may be opaque, and the video processor 28 may be configured for intermixing the video data originating from real objects of the ambient environment from the forward-facing camera(s) 24 with video data representing virtual objects, in which case, the projection assembly(ies) 34 may project the intermixed video data onto the opaque display screen(s) 32.

The audio subsystem 20 comprises one or more audio sensors (e.g., microphones) 36, an audio processor 38, and one or more speakers 40.

The microphone(s) 36 are configured for capturing and converting real sound originating from the ambient environment, as well as speech of the user 12 for receiving commands or narration from the user 12, into an audio signal. The microphone(s) 36 are preferably located near the mouth of the user 12 to preferentially capture sounds originating from the user 12. In one embodiment, each of the microphone(s) 36 may be electret condenser microphone (ECM) that includes a capacitive sensing plate and a field effect transistor (FET) amplifier. The FET amplifier can be in an integrated circuit (IC) die located within the microphone package enclosure. The IC die may additionally include an analog to digital converter (ADC) for digital microphone applications. In another embodiment, each of the microphone(s) may be a micro-electro-mechanical systems (MEMS) microphone. Similar to an ECM, a MEMS microphone may feature capacitive sensing with a fixed diaphragm. In addition to an amplifier and ADC, a MEMS IC die may include a charge pump to bias to diaphragm. ECM and MEMS microphone packages include a sound inlet, or hole, adjacent the capacitive sensing plate or membrane for operation, e.g., to allow the passage of sound waves that are external for the package. A particle filter may be provided in order to mitigate the impact of particles on operation. Sound waves entering through the sound inlet exert a pressure on the capacitive sensing plate or membrane, and an electrical signal representing the change a capacitance is generated. The microphone(s) 36 may be coupled to the audio processor 38 via a wired connection (e.g., a flex printed circuit board (PCB) connection) or a wireless connection.

The audio processor 38 is configured for acquiring audio content and meta data associated with the virtual objects from the three-dimensional database 16 and acquiring head pose data of the user 12 (which will be used to localize the absolute meta data for the audio to the head of the user 12 from the head/object tracking subsystem 14, and rendering spatialized audio therefrom. The speaker(s) 40 are configured for presenting sound only from virtual objects to the user 12, while allowing the user 12 to directly hear sound from real objects. The speaker(s) 40 may be positioned adjacent (in or around) the ear canals of the user 12, e.g., earbuds or headphone, to provide for stereo/shapeable sound control. Alternatively, instead of being positioned adjacent the ear canals, the speaker(s) 40 may be positioned remotely from the ear canals. For example, speaker(s) 40 may be placed at a distance from the ear canals, e.g., using a bone conduction technology. Thus, the audio processor 38 may convey the rendered spatialized audio to the speaker(s) 40 for transformation into spatialized sound that is intermixed with the sounds originating from the real objects in the ambient environment. The audio processor 38 may also intermix the audio signal output by the microphone(s) 36 with the audio data from virtual sound, in which case, the speaker(s) 40 may convey sound representative of the intermixed audio data to the user 12.

Figure 2A:
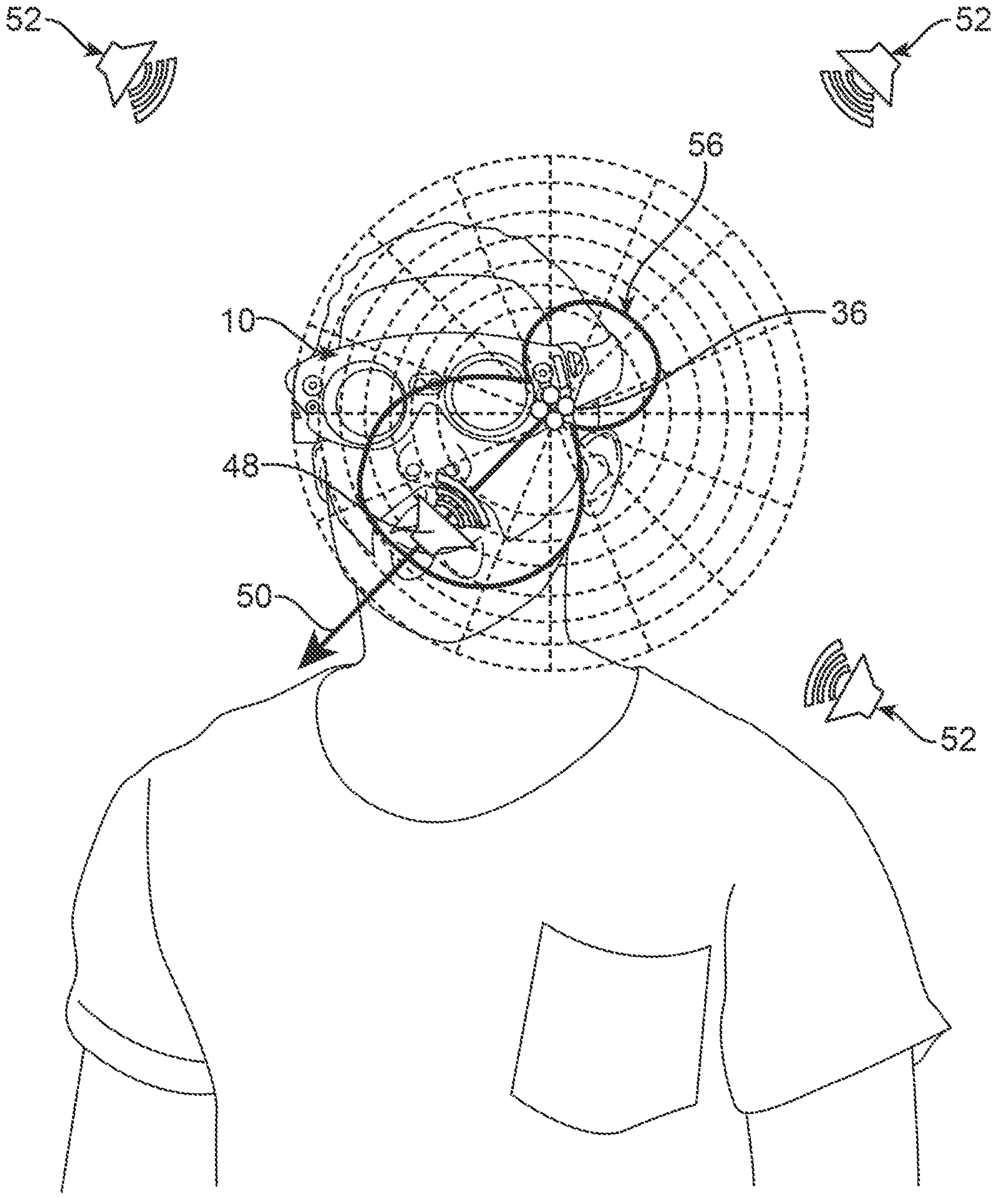
FIG. 2A is a diagram illustrating a beamforming technique employed by a microphone array of the virtual image generation system, particularly showing a preferential selection of sound originating from a mouth of a user.
Figure 2B:
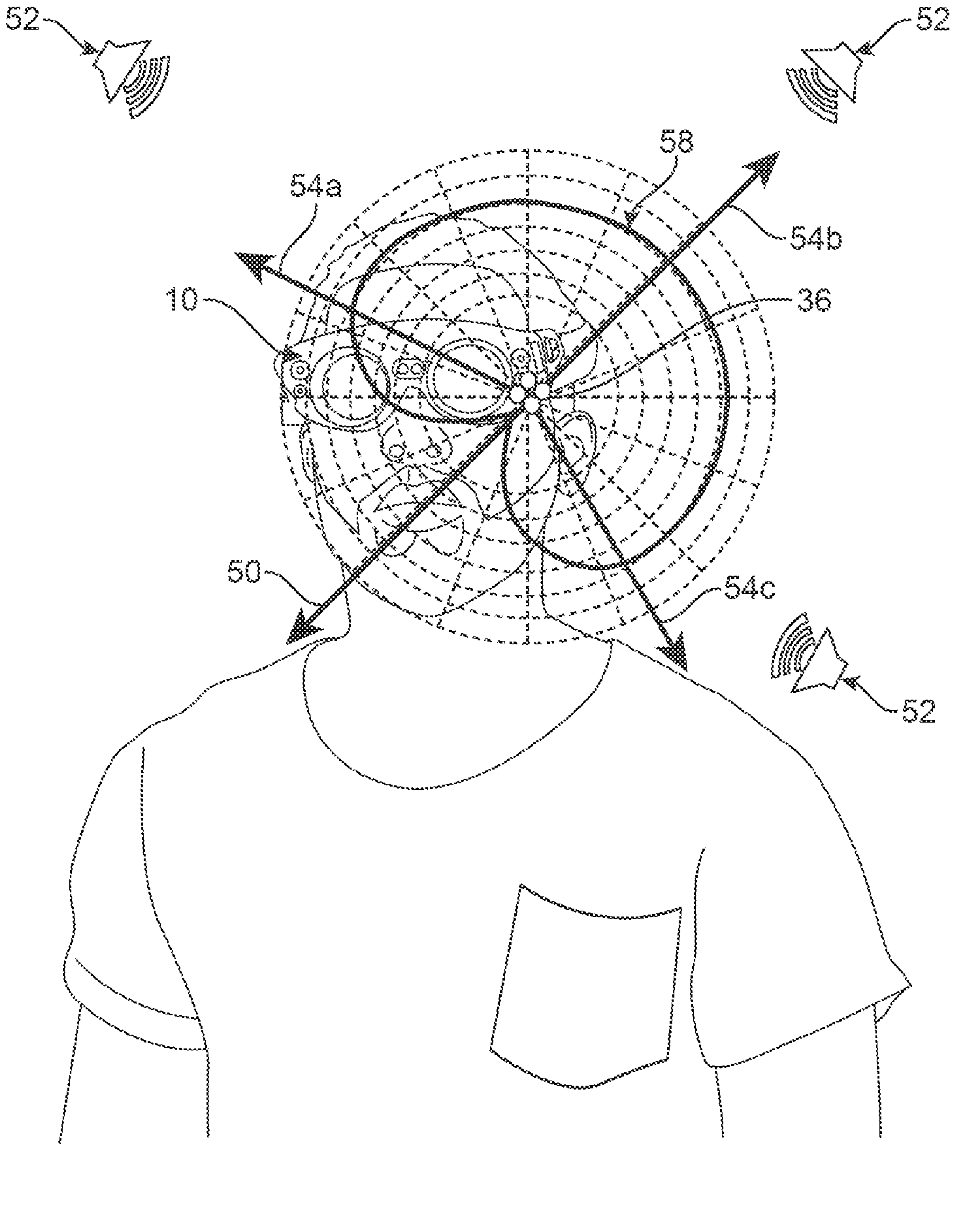
FIG. 2B is a diagram illustrating a beamforming technique employed by the microphone array of the virtual image generation system, particularly showing a preferential selection of sound originating from an ambient environment.

In one embodiment illustrated in FIGS. 2A-2B, the microphone(s) 36 takes the form of an array of microphone elements 36 that can employ beamforming or spatial filtering techniques for directional signal transmission and/or reception by combining the audio signal output by the microphone elements 36 in a manner that the sound received at one or more particular angles or angular ranges experience constructive interference while sound received at other angles or angular ranges experience descriptive interference, thereby providing the microphone array 36 with specific directivity. The audio processor 38 may be configured for combining the audio signal output by the microphone array 36 in a manner that effects a desired specific directivity.

As illustrated in FIG. 2A, the audio signal output by the microphone array 36 are combined in a manner that sound 48 originating from an angle 50 pointing to the mouth of the user 12 is constructively combined, whereas the audio signal output by the microphone array 36 are combined in a manner that sounds 52 originating from angles 54*a*-54*c* pointing to the ambient environment are destructively combined, such that the microphone array 36 has a first directivity 56 that preferentially selects sound 48 from the mouth of the user 12. In contrast, as illustrated in FIG. 2B, audio signal output by the microphone array 36 are combined in a manner that the sound 48 originating from an angle 50 pointing to the mouth of the user 12 is destructively combined, whereas the audio signal output by the microphone array 36 are combined in a manner that the sounds 52 originating from angles 54*a*-54*c* pointing to the ambient environment are constructively combined, such that the microphone array 36 has a second directivity 58 that preferentially selects sounds 52 from the ambient environment.

Referring back to FIG. 1, the user speech subsystem 22 comprises one or more vibration voice pickup sensors (VVPU) sensors 42, a user speech processor 44, and a speech recognition engine 46.

The VVPU sensor(s) 42 are configured for converting vibration originating from voiced sound originating from the user 12 into electrical signals for sensing when the user 12 speaks. Such voiced or non-voiced sound may be transmitted through the bone structure and/or tissues of the user 12 and/or other rigid structure in direct contact with the head of the user 12. The VVPU sensor(s) 42 may be located in direct contact with the head of the user 12 or in direct contact with any structure in direct contact with the user 12 that allows the VVPU sensor(s) 42 to be vibrationally coupled to the head of the user 12. In this manner, the VVPU sensor(s) may detect and receive vibrations transmitted from the user's 12 vocal cord through bone structures and/or tissues. For example, the VVPU sensor(s) 42 may be located in or near the nose, eyebrow, or temple areas of the user 12. The VVPU sensor(s) 42 may be overmolded in plastic, adhered to a metal or plastic housing, embedded in foam, or contained by other materials with other manufacturing techniques. The VVPU sensor(s) 42 may be coupled to the user speech processor 44 via a wired connection (e.g., a flex printed circuit board (PCB) connection) or a wireless connection.

Each VVPU sensor 42 may, e.g., an accelerometer, a strain gauge, an eddy-current device, or any other suitable devices that may be used to measure vibrations. An accelerometer measures the vibration or acceleration of motion of a structure and may have a transducer that converts mechanical force caused by vibration or a change in motion into an electrical current using the piezoelectric effect (e.g., a high impedance piezoelectric accelerometer, a low Impedance piezoelectric accelerometer, etc.). A strain gauge includes a sensor whose resistance varies with applied force and converts force, pressure, tension, weight, etc., into a change in electrical resistance which may then be measured. An Eddy-current sensor may include a non-contact device that measure the position and/or change of position of a conductive component. In some embodiments, an Eddy-current sensor may operate with magnetic fields and may have a probe which creates an alternating current at the tip of the probe. It shall be noted that other types of VVPU sensors may also be used. For example, a laser displacement sensor, a gyroscope or other similar contact sensors, a non-contact proximity sensor, a vibration meter, or a velocity sensor for sensing low-frequency vibration measurements, etc. may also be used in some embodiments. Preferably, each VVPU sensor 42 senses vibrations only on one axis, e.g., perpendicular to a skin contact plane. Alternatively, however, each VVPU sensor 42 may sense vibrations in multiple axes, which may then be translated to a single idea axis of vibration.

In some embodiments, the VVPU sensor(s) 42 may be integrated with microphone array 36 in an inseparable device or package. For example, a VVPU sensor 42 and the microphone array 36 may be integrated within a micro-electro-mechanical system (MEMS) that may be manufactured with microfabrication techniques or within a nano-electro-mechanical system (NEMS) that may be manufactured with nanofabrication techniques.

The user speech processor 44 is configured for determining voice activity by the user 12 based on the electrical signal acquired from the VVPU sensor(s) 42, by itself, or in conjunction with an audio signal acquired from the microphone array 36. The speech recognition engine 46 is configured for interpreting the audio signal acquired from the microphone array 36 (i.e., the voiced sound of the user 12 captured by the microphone array 36) into speech, e.g., commands issued by the user 12.

The virtual image generation system 10 may be configured for performing a function based on whether or not voice activity by the user 12 is determined.

For example, in response to determining voice activity by the user 12, the user speech processor 44 may convey the audio signals output by the microphone array 36 to the speech recognition engine 46, which can then interpret the audio signals acquired from the microphone array 36 (i.e., the voiced sound of the user 12 captured by the microphone array 36) into speech, e.g., into commands issued by the user 12. These commands can then be sent to a processor or controller (not shown) that would perform certain functions that are mapped to these commands. These functions may be related to controlling the virtual experience of the user 12. In response to determining no voice activity by the user 12, the user speech processor 44 may cease conveying, or otherwise not convey, audio signals output by the microphone array 36 to the speech recognition engine 46.

As another example, in response to determining voice activity by the user 12, the audio processor 38 may be instructed to process the audio signals output by the microphone array 36 in a manner that the sound originating from the mouth of the user 12 is preferentially selected (see FIG. 2A). In contrast, in response to determining no voice activity by the user 12, the audio processor 38 may be instructed to process the audio signals output by the microphone array 36 in a manner that the sound originating from the ambient environment is preferentially selected (see FIG. 2B). The audio processor 38 may then intermix the audio data of the these preferentially selected sound with virtual sound to create intermixed audio data that is conveyed as sound to the user 12 via the speaker(s) 40.

As still another example, in response to determining voice activity by the user 12, various components of the virtual generation system 10 may be activated, e.g., the microphone array 36 or the speech recognition engine 46. In contrast, in response to determining no voice activity by the user 12, such components of the virtual generation system 10 may be deactivated, e.g., the microphone array 36 or the speech recognition engine 46, such that resources may be conserved.

As yet another example, in response to determining voice activity by the user 12, the user speech processor 44 may enhance the audio signals between the microphone array 36 and the speech recognition engine 46. In contrast, in response to determining no voice activity by the user 12, the user speech processor 44, the user speech processor 44 may not enhance the audio signals between the microphone array 36 and the speech recognition engine 46.

Details of the user speech processor 44 in identifying voice from the user 12 in a noisy ambient environment and enhancing speech from the user 12 will be described below. It should be appreciated that although the user speech subsystem 22 is described in the context of the image generation system 10, the user speech subsystem 22 can be incorporated into any system where it is desirable to capture, identify, and enhance of speech of a user in a noisy ambient environment.

Figure 3:
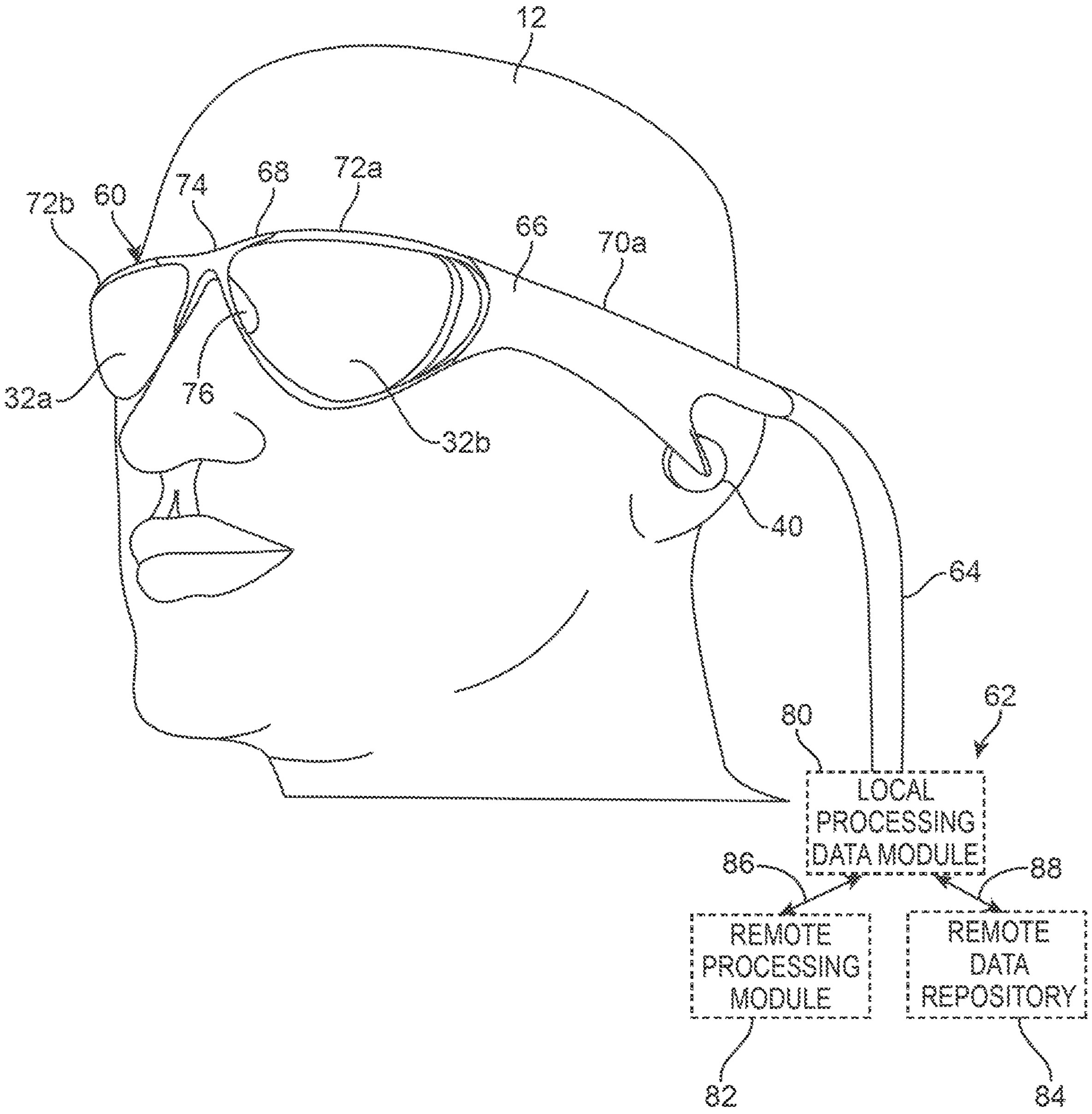
FIG. 3 is a perspective view of the virtual image generation system of FIG. 1, particularly showing one embodiment of an eyewear device worn by the user.
Figure 4:
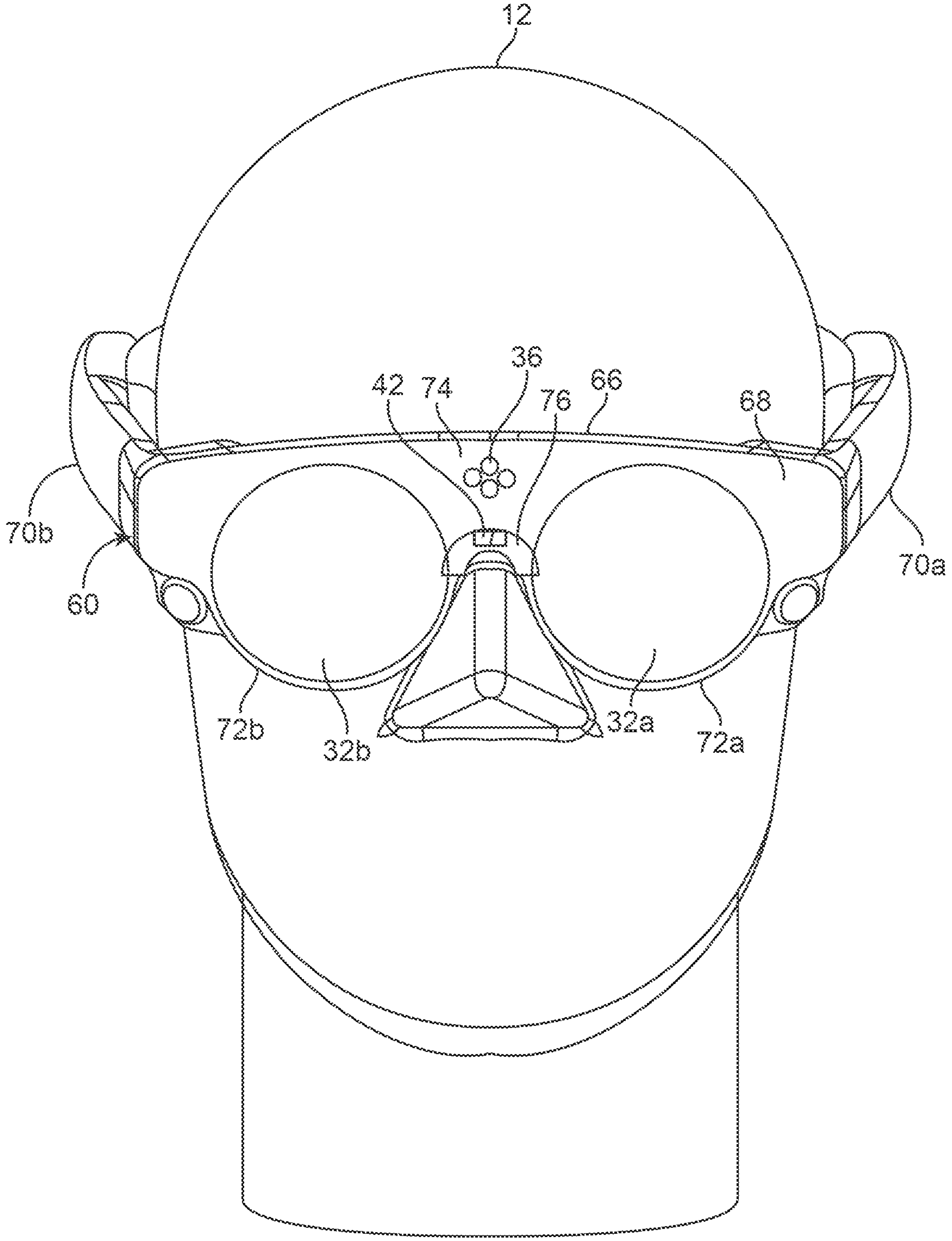
FIG. 4 is a front view of the eyewear device of FIG. 3 worn by the user.
Figure 5:
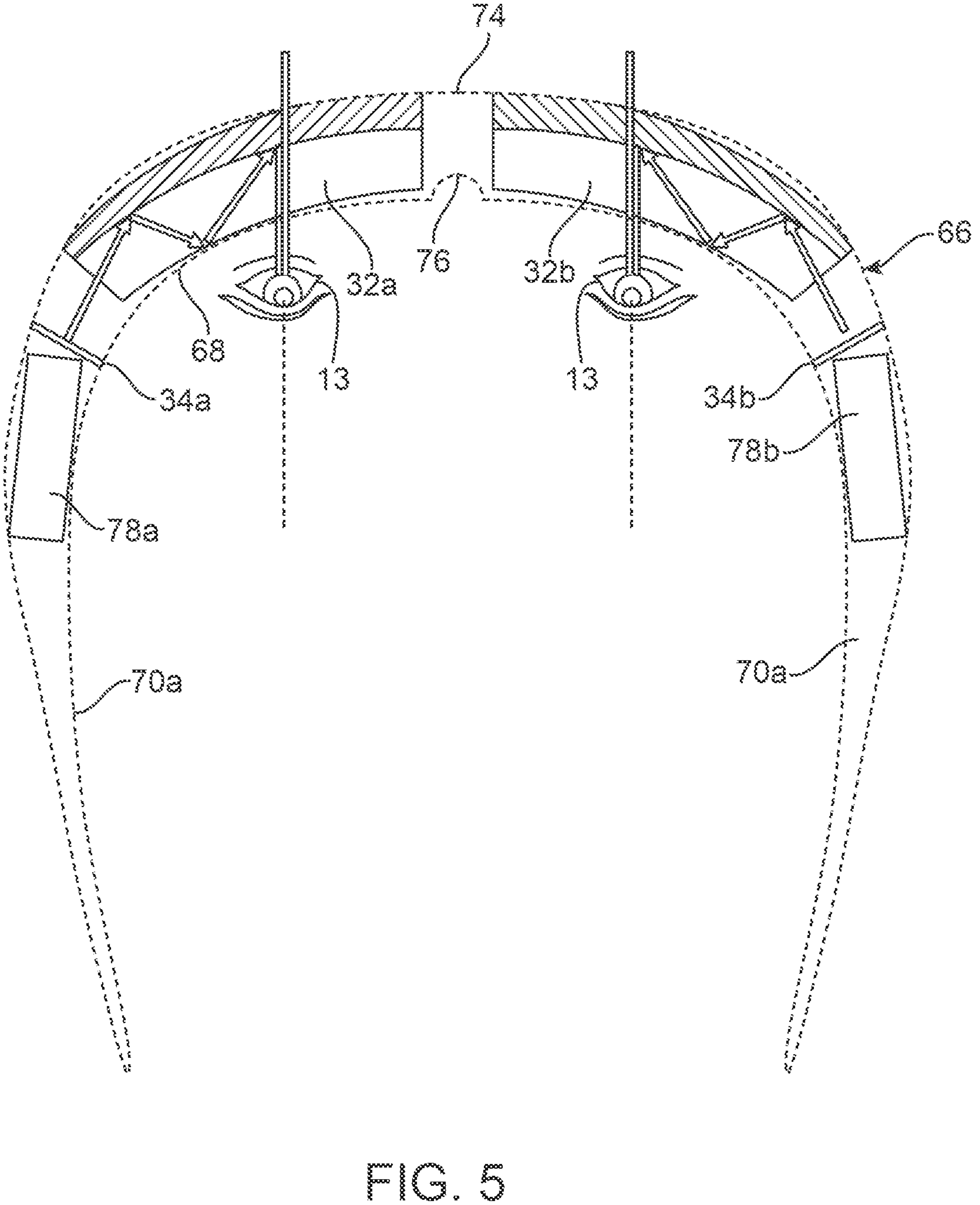
FIG. 5 is a top view of the eyewear device of FIG. 3, wherein the frame structure of the eyewear device is shown in phantom.

Referring now to FIGS. 3-5, the virtual image generation system 10 comprises a user wearable device, and in particular, a headwear device 60, and an optional auxiliary resource 62 configured for providing additional computing resources, storage resources, and/or power to the headwear device 60 through a wired or wireless connection 64 (and in the illustrated embodiment, a cable). As will be described in further detail below, the components of the head/object tracking subsystem 14, three-dimensional database 16, video subsystem 18, audio subsystem 20, user speech subsystem 22, and speech recognition engine 46 may be distributed between the headwear device 60 and auxiliary resource 62.

In the illustrated embodiment, the headwear device 60 takes the form of an eyewear device that comprises a frame structure 66 having a frame front or eyewear housing 68 and a pair of temple arms 70 (a left temple arm 70*a* and a right temple arm 70*b* shown in FIGS. 4-5) affixed to the frame front 68. In the illustrated embodiment, the frame front 68 has a left rim 72*a* and a right rim 72*b* and a bridge 74 with a nose pad 76 disposed between the left and right rims 72*a*, 72*b*. In an alternative embodiment illustrated in FIG. 6, the frame front 68 may have a single rim 72 and a nose pad (not shown) centered on the rim 72. It should be appreciated although the headwear device 60 is described as an eyewear device, it may be any device that has a frame structure that can be secured to the head of the user 12, e.g., a cap, a headband, a headset, etc.

Two forward-facing cameras 26 of the head/object tracking subsystem 14 are carried by the frame structure 66 (as best shown in FIG. 4), and in the illustrated embodiment, are affixed to the left and right sides of the frame front 68. Alternatively, a single camera (not shown) may be affixed to the bridge 74, or an array of cameras (not shown) may be affixed to the frame structure 66 for providing for tracking real objects in the ambient environment. In the latter case, the frame structure 66 may be designed, such that the cameras may be mounted on the front and back of the frame structure 66. In this manner, the array of cameras may encircle the head of the user 12 to cover all directions of relevant objects. In an alternative embodiment, rearward-facing cameras (not shown) may be affixed to the frame front 68 and oriented towards the eyes of the user 12 for detecting the movement of the eyes of the user 12.

The display screen(s) 32 and projection assembly(ies) 34 (shown in FIG. 5) of the display subsystem 30 are carried by the frame structure 66. In the illustrated embodiment, the display screen(s) 32 take the form of a left eyepiece 32*a* and a right eyepiece 32*b*, which are respectively affixed within the left rim 72*a* and right rim 72*b*. Furthermore, the projection assembly(ies) 34 take the form of a left projection assembly 36*a* and a right projection assembly 36*b* carried by the left rim 72*a* and right rim 72*b* and/or the left temple arm 70*a* and the right temple arm 70*b*. As discussed above, the left and right eyepieces 32*a*, 32*b* may be partially transparent, so that the user 12 may see real objects in the ambient environment through the left and right eyepieces 32*a*, 32*b*, while the left and right projection assemblies 34*a*, 34*b* display images of virtual objects onto the respective left and right eyepieces 32*a*, 32*b*. For example, each of the left and right projection assemblies 34*a*, 34*b* may take the form of an optical fiber scan-based projection device, and each of the left and right eyepieces 32*a*, 32*b* may take the form of a waveguide-based display into which the scanned light from the respective left and right projection assemblies 34*a*, 34*b* is injected, thereby creating a binocular image. The frame structure 66 is worn by user 12, such that the left and right eyepieces 32*a*, 32*b* are positioned in front of the left eye 13*a* and right eye 13*b* of the user 12 (as best shown in FIG. 5), and in particular in the field of view between the eyes 13 of the user 12 and the ambient environment. In an alternative embodiment, the left and right eyepieces 32*a*, 32*b* are opaque, in which case, the video processor 28 intermixes video data output by the forward-facing camera 26 with the video data representing the virtual objects, while the left and right projection assemblies 34*a*, 34*b* project the intermixed video data onto the opaque eyepieces 32*a*, 32*b*.

Figure 6:
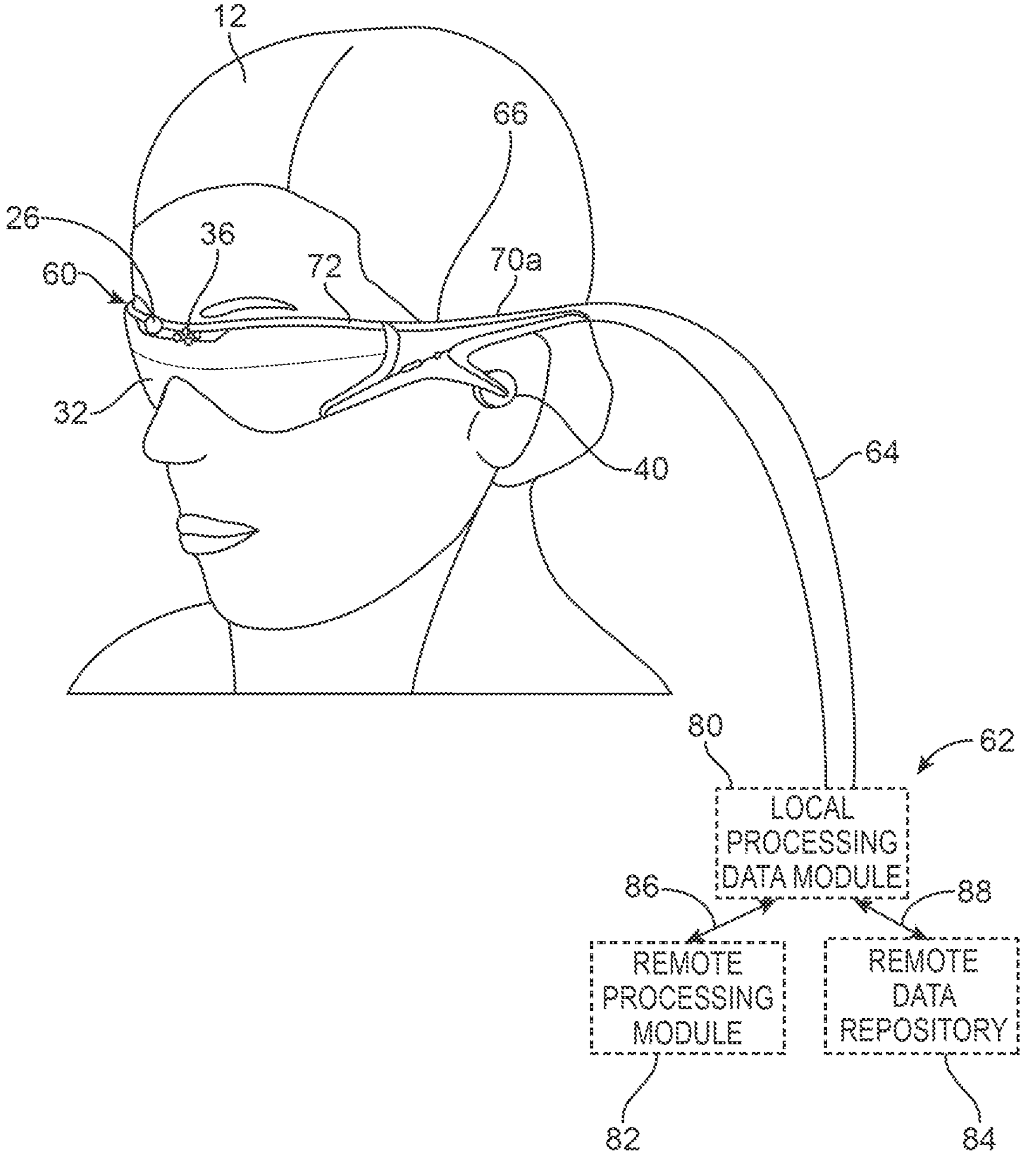
FIG. 6 is a perspective view of the virtual image generation system of FIG. 1, particularly showing another embodiment of an eyewear device worn by the user.

Although the frame front 68 is described as having left and right rims 72*a*, 72*b* in which left and right eyepieces 32*a*, 32*b* are affixed, and onto which scanned light is projected by left and right projection assemblies 34*a*, 34*b* to create a binocular image, it should be appreciated that the frame front 68 may alternatively have a single rim 72 (as shown in FIG. 6) in which a single display screen 32 is affixed, and onto which scanned light is projected from a single projection assembly to create a monocular image.

The speaker(s) 40 are carried by the frame structure 66, such that the speaker(s) 40 are positioned adjacent (in or around) the ear canals of the end user 50. The speaker(s) 40 may provide for stereo/shapeable sound control. For instance, the speaker(s) 40 may be arranged as a simple two speaker two channel stereo system, or a more complex multiple speaker system (5.1 channels, 7.1 channels, 12.1 channels, etc.). In some embodiments, the speaker(s) 40 may be operable to produce a three-dimensional sound field. Although the speaker(s) 40 are described as being positioned adjacent the ear canals, other types of speakers that are not located adjacent the ear canals can be used to convey sound to the user 12. For example, speakers may be placed at a distance from the ear canals, e.g., using a bone conduction technology. In an optional embodiment, multiple spatialized speaker(s) 40 may be located about the head of the user (e.g., four speakers) and pointed towards the left and right ears of the user 12. In alternative embodiments, the speaker(s) 40 may be distinct from the frame structure 66, e.g., affixed to a belt pack or any other user-wearable device.

The microphone array 36 is affixed to, or otherwise, carried by, the frame structure 66, such that the microphone array 36 may be in close proximity to the mouth of the user 12. In the illustrated embodiment, the microphone array 36 is embedded within the frame front 68, although in alternative embodiments, the microphone 42 may be embedded in one or both of the temple arms 70*a*, 70*b*. In alternative embodiments, the microphone array 36 may be distinct from the frame structure 66, e.g., affixed to a belt pack or any other user-wearable device.

The VVPU sensor(s) 42 (best shown in FIG. 4) are carried by the frame structure 66, and in the illustrated embodiment, is affixed to the bridge 74 within the nose pad 76, such that, when the user 12 is wearing the eyewear device 60, the VVPU sensor(s) 42 are vibrationally coupled to the nose of the user 12. In alternative embodiments, one or more of the VVPU sensor(s) 42 is located elsewhere on the frame structure 66, e.g., at the top of the frame front 68, such that the VVPU sensor(s) 42 are vibrationally coupled to the eyebrow areas of the user 12, or one or both of the temple arms 70*a*, 70*b*, such that the VVPU sensor(s) 42 are vibrationally coupled to one or both of the temples of the user 12.

The headwear device 60 may further comprise at least one printed circuit board assembly (PCBA) 78 affixed to the frame structure 66, and in this case, a left PCBA 78*a* contained within the left temple arm 70*a* and a right PCBA 78*b* contained with in the right temple arm 70*b*. In one embodiment, the left and right PCBAs 78*a*, 78*b* carry at least some of the electronic componentry (e.g., processing, storage, and power resources) for the tracking processor 26 of the head/object tracking subsystem 14, video subsystem 18, audio subsystem 20, user speech subsystem 22.

The three-dimensional database 16 and at least some of the computing resources, storage resources, and/or power resources of the head/object tracking subsystem 14, video subsystem 18, audio subsystem 20, user speech subsystem 22, and speech recognition engine 46 may be contained in the auxiliary resource 62.

For example, in some embodiments, the eyewear device 60 includes some computing and/or storage capability for displaying virtual content to the user 12 and conveying sound to and from the user 12, while the optional auxiliary resource 62 provides additional computation and/or storage resources (e.g., more instructions per second (IPS), more storage space, etc.) to the eyewear device 60. In some other embodiments, the headwear device 12 may include only the necessary components for determining the head pose of the user 12 and tracking the position and orientation of real objects relative to the head of the end user 12 (e.g., only the camera(s) 24 of the head/object tracking subsystem 14), displaying virtual content to the user 12 (e.g., only the eyepieces 32*a*, 32*b* and projection assemblies 34*a*, 34*b* of the video subsystem 18), and conveying sound to and from the user 12 (e.g., only the microphone array 36 and speaker(s) 40 of the audio subsystem 20, and the VVPU sensor(s) 42 of the user speech subsystem 22), while the optional auxiliary resource 62 provides all the computing resources and storage resources to the eyewear device 60 (e.g., the tracking processor 26 of the head/object tracking subsystem 14, the video processor 28 of the video subsystem 18, the audio processor 38 of the audio subsystem 20, the user speech processor 44 and speech recognition engine 46 of the user speech subsystem 22). In some other embodiments, the eyewear device 60 may include all the processing and storage components for displaying virtual content to the user 12 and conveying sound to and from the user 12, while the optional auxiliary resource 62 provides only additional power (e.g., a battery with higher capacity than a built-in battery or power source integrated within the eyewear device 60).

Referring to specifically to FIG. 3, the optional auxiliary resource 62 comprises a local processing and data module 80, which is operably coupled to the eyewear device 60 via the wired or wireless connection 64, and remote modules in the form of remote processing module 82 and a remote data repository module 84 operatively coupled, such as by a wired lead or wireless connectivity 86, 88, to the local processing and data module 80, such that these remote modules 82, 84 are operatively coupled to each other and available as resources to the local processing and data module 80.

In the illustrated embodiment, the local processing and data module 80 is removably attached to the hip of the user 12 in a belt-coupling style configuration, although the local processing and data module 80 may be closely associated with the user 12 in other ways, e.g., fixedly attached to a helmet or hat (not shown), removably attached to a torso of the end user 12, etc. The local processing and data module 80 may comprise a power-efficient processor or controller, as well as digital memory, such as flash memory, both of which may be utilized to assist in the processing, caching, and storage of data utilized in performing the functions.

In one embodiment, all data is stored and all computation is performed in the local processing and data module 80, allowing fully autonomous use from any remote modules 70, 72. Portions of the projection assemblies 32*a*, 32*b*, such as the light source(s) and driver electronics, may be contained in the local processing and data module 80, while the other portions of the projection assemblies 32*a*, 32*b*, such as the lenses, waveguides, diffractive elements, projection fibers, may be contained in the eyewear device 60. In other embodiments, the remote modules 70, 72 are employed to assist the local processing and data module 80 in processing, caching, and storage of data utilized in performing the functions of the head/object tracking subsystem 14, three-dimensional database 16, video subsystem 18, audio subsystem 20, and user speech subsystem 22.

The remote processing module 82 may comprise one or more relatively powerful processors or controllers configured to analyze and process data and/or image information. The remote data repository 72 may comprise a relatively large-scale digital data storage facility, which may be available through the internet or other networking configuration in a "cloud" resource configuration. In one embodiment, light source(s) and drive electronics (not shown) of the display subsystem 20, the tracking processor 26 of the head/object tracking subsystem 14, the audio processor 38 of the audio subsystem 20, the user speech processor 44 of the user speech subsystem 22, and the speech recognition engine 46 are contained in the local processing and data module 80, while the video processor 28 of the video subsystem 18 may be contained in the remote processing module 82, although in alternative embodiments, any of these processors may be contained in the local processing and data module 80 or the remote processing module 82. The three-dimensional database 16 may be contained in the remote data repository 72.

The tracking processor 26, video processor 28, audio processor 38, user speech processor 44, and speech recognition engine 46 may take any of a large variety of forms, and may include a number of controllers, for instance one or more microcontrollers, microprocessors or central processing units (CPUs), digital signal processors (DSPs), graphics processing units (GPUs), other integrated circuit controllers, such as application specific integrated circuits (ASICs), programmable gate arrays (PGAs), for instance, field PGAs (FPGAs), and/or programmable logic controllers (PLUs). At least some of the processors may be combined into a single integrated device, or at least one of the processors may be distributed amongst several devices. The functionalities of any of the tracking processor 26, video processor 28, audio processor 38, user speech processor 44, and speech recognition engine 46 may be implemented as a pure hardware module), a pure software module, or a combination of hardware and software. The tracking processor 26, video processor 28, audio processor 38, user speech processor 44, and speech recognition engine 46 may include one or more non-transitory computer- or processor readable medium that stores executable logic or instructions and/or data or information, which when executed, perform the functions of these components. The non-transitory computer- or processor-readable medium may be formed as one or more registers, for example of a microprocessor, FPGA, or ASIC, or can be a type of computer-readable media, namely computer-readable storage media, which may include, but is not limited to, RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

Figure 7A:
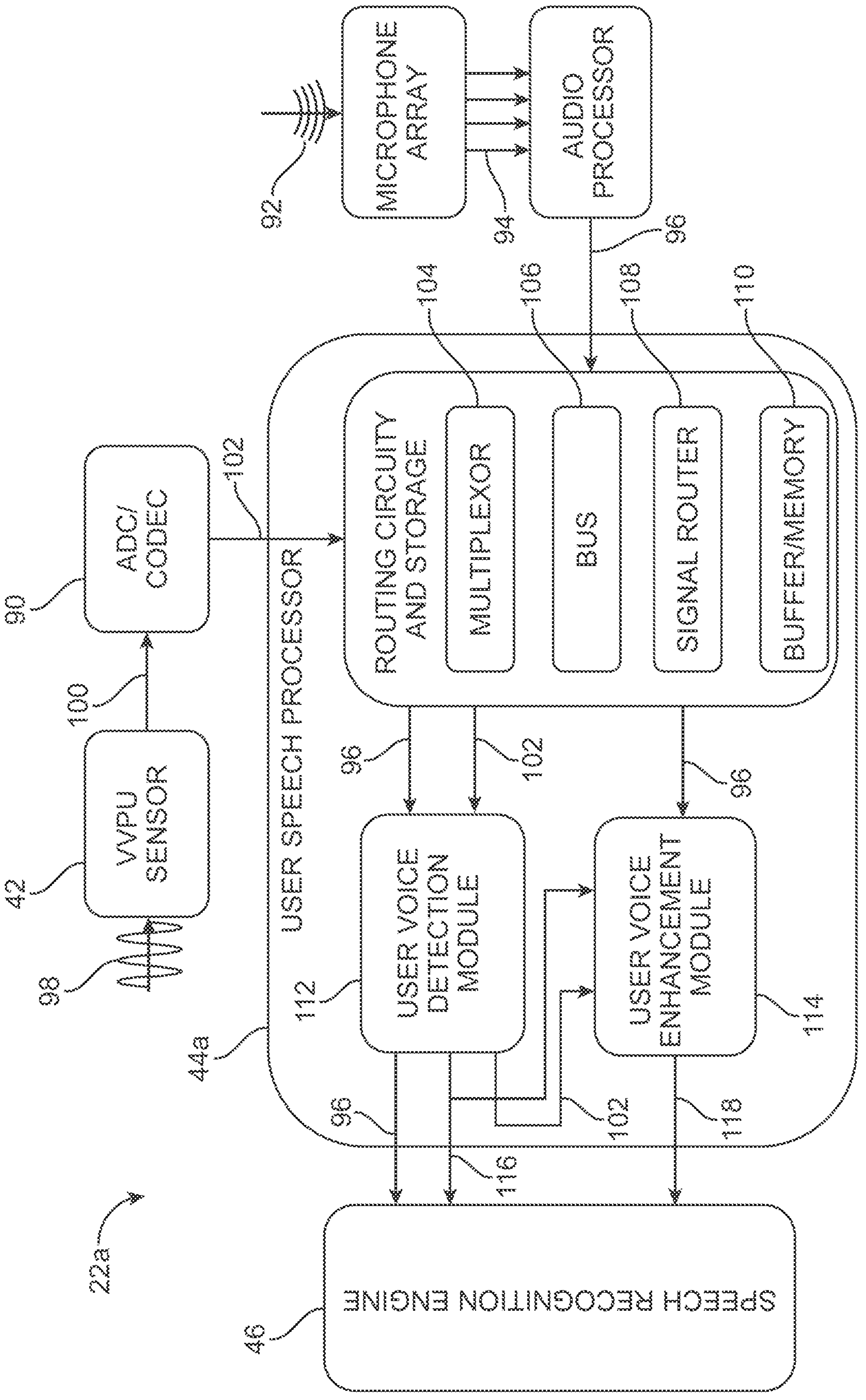
FIG. 7A is a block diagram of one embodiment of a user speech subsystem of the virtual image generation system of FIG. 1.

Referring now to FIG. 7A, one embodiment of a user speech subsystem 22*a* will be described. In addition to the afore-mentioned VVPU sensor 42 and user speech processor 44*a*, the user speech subsystem 22*a* comprises a signal processing device 90 (e.g., an analog-to-digital converter, a coder-decoder/compression-decompression module or codec).

The microphone array 36 is configured for capturing sound 92 originating from voiced sound from the user 12, as well as sound originating environmental noise (e.g., wind noise, other persons in the background, or other types of ambient noises), and outputting analog audio signals 94 representative of the acquired sound 92. These analog audio signals 94 are converted into a digital audio signal 96. For example, as discussed above, the audio processor 38 may combine the analog audio signals 94 into a digital audio signal 96 in a manner, such that sounds from the mouth of the user 12 are preferentially selected (see FIG. 2A), or may combine the analog audio signals 94 into a digital audio signal 96 in a manner, such that sounds from the ambient environment are preferentially selected (see FIG. 2B). Although the audio processor 38 is illustrated as being distinct from the user speech processor 44*a*, it should be appreciated that the functions of the audio processor 38 and user speech processor 44*a* may be incorporated into the same physical processor.

Because the VVPU sensor 42 is vibrationally coupled to the head of the user 12, the VVPU sensor 42 is configured for capturing vibration 98 originating from voiced sound of the user 12 that are transmitted through the bone structure and/or tissues in the head of the user 12, and outputting an analog vibration signal 100 representative of the vibration 98. The signal processing device 90 is configured for converting the analog vibration signal 100 output by the VVPU sensor 42 into a digital vibration signal 102. The signal processing device 90 may also be configured for compressing the analog vibration signal 100 to reduce the bandwidth required for transmitting the digital vibration signal 102 to the user speech processor 44*a*. For example, the digital vibration signal 102 may include a digital signal stream, such as, e.g., a pulse-code modulation (PCM) stream or other types of digital signal streams.

In one embodiment, the user speech processor 44*a* is an embedded processor, such as a central processing unit (CPU), that includes processing resources and input/output (I/O) capabilities in a low power consumption design. In this embodiment, the user speech processor 44*a* may be further coupled to external components, such as a multiplexer 104, one or more busses 106 (e.g., a parallel bus, a serial bus, a memory bus, a system bus, a front-side bus, etc.), one or more peripheral interfaces, and/or a signal router 108 for routing signals and data, buffer, memory, or other types of storage medium or media 110, and/or any other required or desired components, etc. In some other embodiments, the user speech processor 44*a* includes a microcontroller and may be self-contained without requiring the aforementioned external components.

The user speech processor 44*a* comprises a user voice detection module 112 configured for determining if the user 12 is generating voiced speech (i.e., whether sound 92 captured by the microphone array 36 includes voiced sound by the user 12) at least based on the digital vibration signal 102 corresponding to the vibration 98 captured by the VVPU sensor 42, and a user voice enhancement module 114 configured for enhancing the voiced sound of the user 12 contained in the digital audio signal 96 associated with the microphone array 36.

In one embodiment, the user voice detection module 112 is configured for performing an analysis only on the digital vibration signal 102 associated with the VVPU sensor 42 to determine whether the sound 92 captured by the microphone array 36 comprises a voiced sound that originates from the user 12 of the eyewear device 60. For example, the user voice detection module 112 may determine within a time period whether one or more characteristics of the digital vibration signal 102 (e.g., magnitude, power, or other suitable characteristics, etc.) have a sufficient high level (e.g., exceeds a certain threshold level), so that it may be determined that the VVPU sensor 42 captured significant vibration, rather than merely some insignificant vibration (e.g., vibration from environment sources transmitted indirectly via the body or head of the user 12 that are inadvertently captured by the VVPU sensor 42). In this embodiment, the output of the VVPU sensor 42 may be calibrated or trained with one or more training datasets (e.g., the user 12 wearing an eyewear device 60 and speaking with one or more various tones to the eyewear device 60, the same user 12 remaining silent while allowing the microphone array 36 to capture environment sounds in one or more environments, etc.) to learn the characteristics of the digital vibration signal 102 output by the VVPU sensor 42 that correspond to actual speaking of the user 12, and the characteristics of the digital vibration signal 102 output by the VVPU sensor 42 correspond to actual speaking of the user 12 that correspond to sounds produced by other sources in the ambient environment.

In another embodiment, the user voice detection module 112 may be configured for performing a first analysis on the digital audio signal 96 associated with the microphone array 36 and generating a first result, performing a second analysis on the digital vibration signal 102 associated with the VVPU sensor 42 and generating a second result, comparing the first and second results, and determining whether sound 92 captured by the microphone array 36 comprises a voiced sound that originates from the user 12 of the eyewear device 60 based on the comparison. Such comparison of the first and second results may comprise determining that a relationship or correlation (e.g., a temporal correlation) exists between the first and second results with a threshold degree of confidence level, in which case, the user voice detection module 112 determines that the sound 92 captured by the microphone array 36 comprises a voiced sound that originates from the user 12 of the eyewear device 60; that is, the user 12 is generating voiced speech. Preferably, prior to analyzing the digital audio signal 96 and digital vibration signal 102, these signals are temporally aligned to account for different transmission path lengths (e.g., wired versus wireless).

As one example, it may be determined that the microphone array 36 contains voiced sound that originates from the user 12 of the eyewear device 60 if, over a temporal period of time, a correlation between the first and second results exhibits a non-negligible characteristic (e.g., a magnitude, a power, or other equivalent measures exceeding a threshold limit) with due regard to negligible differences less than a threshold percentage or portion or a slight mismatch between the first and second results due to signal acquisition and/or transmissions. On the other hand, it may be determined that the microphone array 36 does not contain voiced sound that originates from the user 12 of the eyewear device 60 if, over a temporal period of time, a correlation between the first and second results does not exhibit a non-negligible characteristic (e.g., a magnitude, a power, or other equivalent measures exceeding a threshold limit).

In some embodiments, a correlation may be generated between the first and second results by temporally aligning the digital audio signal 96 associated with the microphone array 36 and the digital vibration signal 102 associated with the VVPU sensor 42 in the time domain.

In other embodiments, a correlation may be generated between the first and second results by aligning the corresponding frequencies of two spectra of the digital audio signal 96 associated with the microphone array 36 and the digital vibration signal 102 associated with the VVPU sensor 42 in the frequency domain. The user voice detection module 112 may then perform a correlation analysis on the two spectra to determine whether a correlation exists between frequencies of the spectra of the digital audio signal 96 and the digital vibration signal 102.

The statistical average of a certain signal or sort of signal (including noise) as analyzed in terms of its frequency content is called its spectrum. By analyzing the spectra of the digital audio signal 96 and digital vibration signal 102, dominant frequency, power, distortion, harmonics, bandwidth, and/or other spectral components of the digital audio signal 96 and digital vibration signal 102 may be obtained that are not easily detectable in time domain waveforms. For example, a spectrum analysis may determine a power spectrum of a time series describing the distribution of power into frequency components composing each of the digital audio signal 96 and digital vibration signal 102. In some embodiments, according to Fourier analysis, each of the digital audio signal 96 and digital vibration signal 102 may be decomposed into a number of discrete frequencies, or a spectrum of frequencies over a continuous range. A spectral analysis may, thus, generate output data, such as magnitudes, versus a range of frequencies, to represent the spectrum of the sound 92 captured by the microphone array 36 and the vibration 98 captured by the VVPU sensor 42.

In the illustrated embodiment, when it is determined that the user 12 has generated voiced speech, the user voice detection module 112 generates a gating or flag signal 116 indicating that the VVPU sensor 42 has captured vibration 98 originating from voiced sound of the user 12, and thus, that the sound 92 captured by the microphone array 36 includes voiced sound by the user 12. The user voice detection module 112 may then output the gating or flag signal 116 to the user voice enhancement module 114 (and any other processors or modules, including the speech recognition engine 46). The user voice enhancement module 114 then processes the digital audio signal 96 and outputs an enhanced digital audio signal 118 to the speech recognition engine 46 for interpreting the enhanced digital audio signal 118 into speech, e.g., commands issued by the user 12 and/or outputs the enhanced digital audio signal 118 to a processing device that performs other functions of the virtual generation system 10 (e.g., preferentially selecting the sound originating from the mouth of the user 12 via the audio processor 38, activating various components of the virtual generation system 10, e.g., the microphone array 36 or the speech recognition engine 46, etc.).

In alternative embodiments (e.g., if the user speech processor **44*a* does not have the user voice enhancement module 114), the user voice detection module 112 may directly output the digital audio signal 96 to the speech recognition engine 46 for interpreting the digital audio signal 96 into speech, e.g., commands issued by the user 12 and/or outputs the digital audio signal 96 to a processing device that performs other functions of the virtual generation system 10 (e.g., preferentially selecting the sound originating from the mouth of the user 12 via the audio processor 38, activating various components of the virtual generation system 10, e.g., the microphone array 36 or the speech recognition engine 46**, etc.).

In other embodiments, the user voice detection module 112 may forward the digital vibration signal 102 to the user voice enhancement module 114 for use in enhancing the digital audio signal 96, as will be discussed in further detail below. In still other embodiments, the user voice detection module 112 may forward only a portion of the digital vibration signal 102 to the user voice enhancement module 114 for use in enhancing the digital audio signal 96. For example, the user voice detection module 112 may perform spectral processing on the digital vibration signal 102 on selected frequency bands, such that only a portion of the digital vibration signal 102 is forwarded to the user voice enhancement module 114. In one embodiment, the user voice detection module 112 may frequency filter the digital vibration signal 102 at a particular frequency threshold and forward the frequency filtered digital vibration signal 102 to the user voice enhancement module 114. For example, the voice detection module 112 may employ a low pass filter (e.g., 100 Hz or less) and forward the low frequency components of the digital vibration signal 102 to the user voice enhancement module 114 and/or may employ a high pass filter (e.g., 100 Hz or greater) and forward the high frequency components of the digital vibration signal 102 to the user voice enhancement module 114.

In yet other embodiments, the user voice detection module 112 may output the results of any analysis previously performed to determine whether or not the sound 92 captured by the microphone array 36 comprises a voiced sound that originates from the user 12 of the eyewear device 60. For example, the user voice detection module 112 may output the spectra of the digital audio signal 96 and digital vibration signal 102 to the user voice enhancement module 114.

In the illustrated embodiment, the user voice enhancement module 114 uses the digital vibration signal 102 to enhance the digital audio signal 96. In one embodiment, the user voice enhancement module 114 uses the digital vibration signal 102 to enhance the digital audio signal 96 based at least in part the noise level of the digital audio signal 96. For example, when the noise level of the digital audio signal 96 is below a threshold limit, the digital vibration signal 102 or the portion thereof may not be forwarded from the user voice detection module 112 to the user voice enhancement module 114, or the user voice enhancement module 114 may otherwise discard the digital vibration signal 102 or the portion thereof, such that the user voice enhancement module 114 does not enhance the digital audio signal 96 with the digital vibration signal 102, or may not enhance the digital audio signal 96 at all, in which case, the user voice detection module 112 may directly output the unenhanced digital audio signal 96 to the speech recognition engine 46 or other processor, as discussed above. In contrast, when the noise level of the digital audio signal 96 is above a threshold limit, the digital vibration signal 102 or the portion thereof may be forwarded from the user voice detection module 112 to the user voice enhancement module 114, such that it can be used by the user voice enhancement module 114 to enhance the digital audio signal 96.

In one embodiment, the user voice enhancement module 114 combines at least a portion of the digital vibration signal 102 with the digital audio signal 96. For example, the user voice enhancement module 114 may scale the digital audio signal 96 in accordance with first scaling factor, scale the digital vibration signal 102 in accordance with a second scaling factor, and then combine the scaled digital audio signal 96 and scaled vibration signal 102. The first and the second factors may or may not necessarily be identical and are often, but not always, different from each other. The user voice enhancement module 114 may either combine the digital audio signal 96 and digital vibration signal 102 in the frequency domain (which combination can then be converted back to the time domain) or in the time domain.

In another embodiment, the user voice enhancement module 114 performs spectral mixing on the digital audio signal 96 and digital vibration signal 102 to enhance the digital audio signal 96. Spectral mixing of the digital audio signal 96 and digital vibration signal 102 may be performed by combining, averaging, or any other suitable processing based on any suitable statistical measures. For example, the user voice enhancement module 114 may enhance a portion of the digital audio signal 96 within a particular frequency range by replacing or combining frequency components of the digital audio signal 96 within that particular frequency range with frequency components of the digital vibration signal 102 within that particular frequency range.

As another example, the user voice enhancement module 114 may perform an auto-correlation between the spectra of the digital audio signal 96 and the digital vibration signal 102, and perform one or more spectral mixing techniques, including spectral subtraction, spectral summation, spectral decomposition, and/or spectral shaping, etc. For example, noise may be determined by performing spectral analysis that generates the spectra of the digital audio signal 96 and the digital vibration signal 102, performing an auto-correlation between the spectra of the digital audio signal 96 and the digital vibration signal 102, and determining the frequency or frequencies that correspond to sound voiced by the user 12 by spectral subtraction. The remaining frequency components after the spectra subtraction may be noise. As another example, spectral shaping involves applying dynamics processing across the frequency spectrum to bring balance to sound by applying focused dynamics processing to one or more portions of a sound waveform (e.g., a transient portion where the sound signal exhibits certain magnitudes, power, or pressure, etc.) in the frequency spectrum in the time-domain at least by employing a low-ratio compression across one or more frequency bands as necessary, with unique time constant(s) and automatic adjustment of thresholds based at least in part on the digital audio signal 96.

In some other embodiments, the user voice enhancement module 114 performs pitch adjustment to enhance the digital audio signal 96. For example, the user voice enhancement module 114 may use the digital vibration signal 102 (e.g., power of the digital vibration signal 102) to determine a pitch estimate of the corresponding voiced sound of the user 12 in the digital audio signal 96. For example, a first statistical measure (e.g., an average) of a most advanced digital vibration signal 102, as well as a second statistical measure of two delayed digital vibration signal 102 may be determined. A pitch estimate may be determined by combining the most advanced digital vibration signal 102 and the two delayed digital vibration signals 92 by using an auto-correlation scheme or a pitch detection scheme. The pitch estimate may be in turn used for correcting the digital audio signal 96.

In one embodiment, the digital audio signal 96 associated with the microphone array 36 and/or the digital vibration signal 102 associated with the VVPU sensor 42 may be spectrally pre-processed to facilitate determination of whether the sound 92 captured by the microphone array 36 includes voiced sound by the user 12 and/or to facilitate enhancement of the digital audio signal 96 associated with the sound 92 captured by the microphone array 36. For example, spectral denoising may be performed on the digital audio signal 96 and the digital vibration signal 102, e.g., by applying a high-pass filter with a first cutoff frequency (e.g., at 50 Hz or higher) to remove stationary noise signals with spectral subtraction (e.g., power spectra subtraction) for noise cancellation and/or to remove crosstalk with echo cancellation techniques to enhance the speaker identification and/or voice enhancement functions. The spectral denoise process may be performed by using a machine-learning based model that may be tested and trained with one or more different types and/or levels of degradation (e.g., noise-matched types and/or levels, noise-mismatched types and/or levels, etc.) data sets. In these embodiments, the windowing may be adjusted during the training phase for mean and variance computation in order to obtain optimal or at least improved computation results. A machine-learning model may also be validated by using a known validation dataset.

Figure 7B:
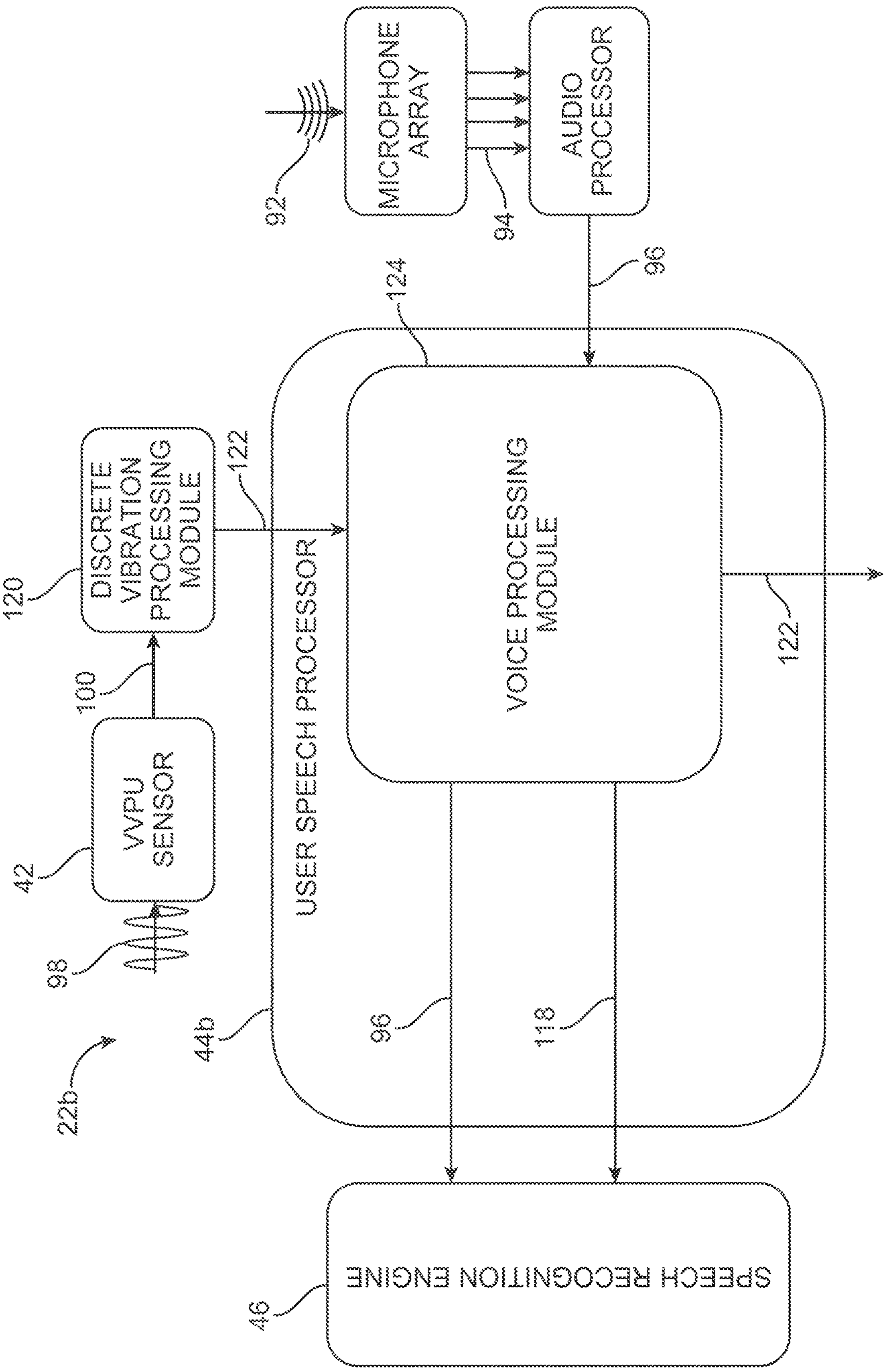
FIG. 7B is a block diagram of another embodiment of a user speech subsystem of the virtual image generation system of FIG. 1.

Referring now to FIG. 7B, another embodiment of a user speech subsystem 22*b* will be described. The user speech subsystem 22*b* differs from the user speech subsystem 22*a* illustrated in FIG. 7A in that the user speech subsystem 22*b* comprises a discrete vibration processing module 120 configured for, in response to receiving an analog vibration signal 100 from the VVPU sensor 42 that is above a threshold level, generating a gating or flag signal 122 indicating that the VVPU sensor 42 has captured vibration 98 originating from voiced sound of the user 12, and thus, indicating that the sound 92 captured by the microphone array 36 includes voiced sound by the user 12.

The user speech subsystem 22*b* further differs from the user speech subsystem 22*a* illustrated in FIG. 7A in that the user speech processor 44*b* comprises, instead of a user voice detection module 112 and a user voice enhancement module 114, a voice processing module 124 configured for processing the digital audio signal 96 in response to receiving the gating or flag signal 122 from the discrete vibration processing module 120. In one embodiment, the voice processing module 124 simply outputs the unenhanced digital audio signal 96 to the speech recognition engine 46 if the noise level of the digital audio signal 96 is below a threshold limit, and outputs an enhanced digital audio signal 118 to the speech recognition engine 46 for interpretation of the enhanced digital audio signal 120 into speech, e.g., commands issued by the user 12. In still another embodiment, the voice processing module 124 uses the gating or flag signal 122 or outputs the gating or flag signal 122 to a processing device to perform other functions of the virtual generation system 10.

Figure 7C:
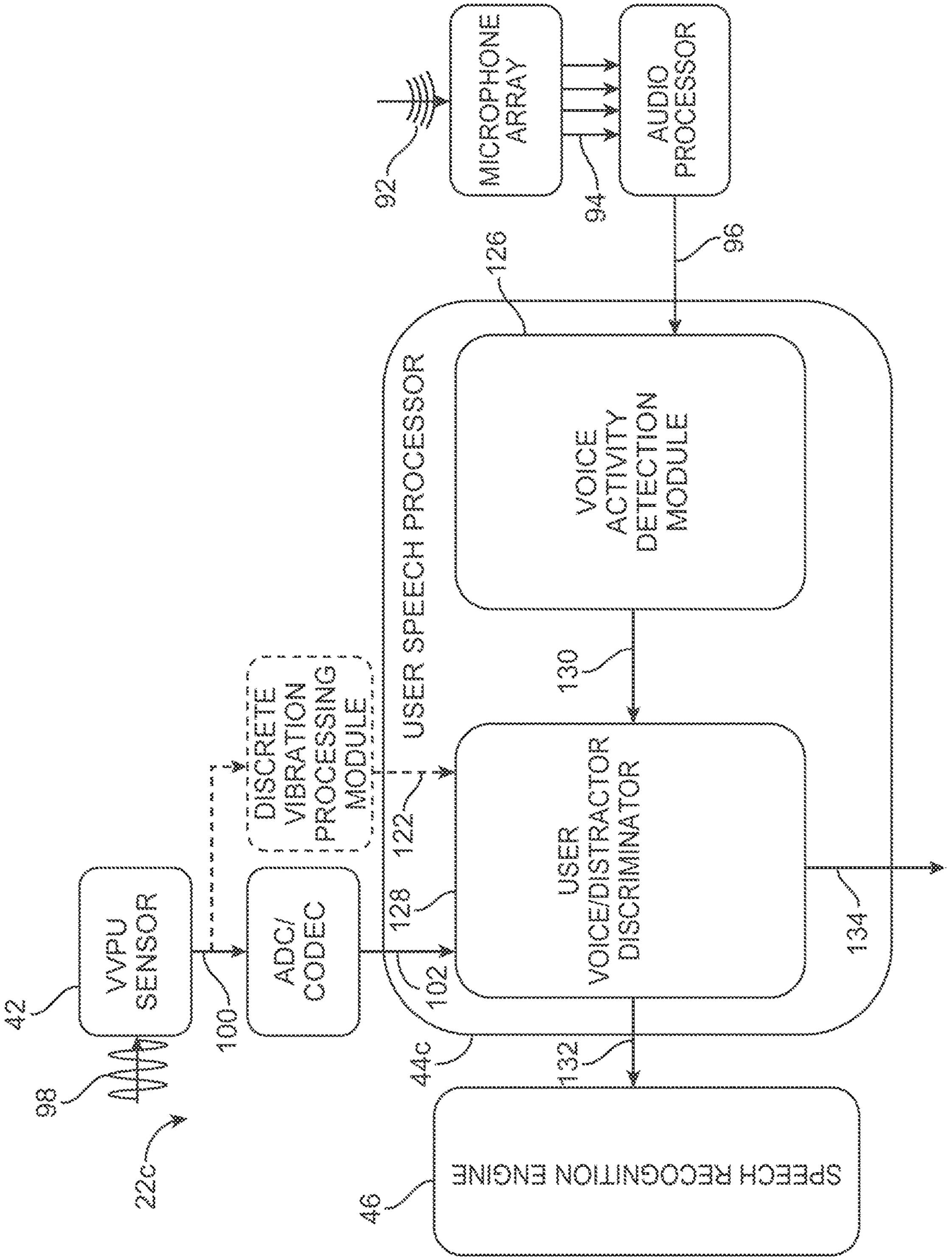
FIG. 7C is a block diagram of still another embodiment of a user speech subsystem of the virtual image generation system of FIG. 1.

Referring now to FIG. 7C, still another embodiment of a user speech subsystem 22*c* will be described. The user speech subsystem 22*c* differs from the speaker identification and speech enhancement subsystems 22*a*, 22*b* respectively illustrated in FIGS. 7A and 7B in that the user speech subsystem 22*c* does not comprise a signal processing device 90 or a discrete vibration processing module 114.

Instead, the user speech processor 44*c* comprises a voice activity detection module 126 configured for detecting voice activity within the digital audio signal 96 associated with the microphone array 36 and outputting a digital voice stream 130, and a user voice/distractor discriminator 128 configured for discriminating between sounds voiced by the user 12 and sound voiced by others in the digital voice stream 130 output by the voice activity detection module 126, and outputting a digital user voice stream 132 (corresponding to the sounds voiced by the user 12) and a digital distractor voice stream 134 (corresponding to the sounds voiced by other people).

In the illustrated embodiment, the user speech subsystem 22*c* may comprise the signal processing device 90 configured for converting the analog vibration signal 100 output by the VVPU sensor 42 into the digital vibration signal 102 (which may or may not be compressed), which is output to the user voice/distractor discriminator 128. Alternatively, the user speech subsystem 22*c* may comprise a discrete vibration processing module 120 configured for generating a gating or flag signal 122 indicating that the VVPU sensor 42 has captured vibration 98 originating from voiced sound of the user 12, which is output to the user voice/distractor discriminator 128. The digital vibration signal 102 or gating or flag signal 122 may trigger or otherwise facilitate the discrimination of the sound voiced by the user 12 and the sound voiced by other others in the digital voice stream 130 by the user voice/distractor discriminator 122.

In one embodiment, the user voice/distractor discriminator 122 may perform a voice and distractor discrimination process to extract, from the digital voice stream 130, the sounds voiced by the user 12 and sounds from others. The user voice/distractor discriminator 122 may perform a voice and distractor discrimination process via one or more spectrum analyses in some embodiments that generate the magnitudes of various frequency components in the digital voice stream 130 with respect to a range of frequencies or a frequency spectrum. The user voice/distractor discriminator 122 may decompose the digital voice stream 130 into a plurality of constituent sound signals (e.g., frequency components), determining the respective power profiles of the plurality of constituent sound signals, and distinguishing the constituent sound signals that correspond with sound voiced from the user 12 and sound voiced by others based at least in part one or more threshold power levels of the constituent sound signals. The voice and distractor discrimination process may be performed by using a machine learning model that may be trained with known datasets (e.g., a user's input voice stream, known noise signals with known signal patterns, etc.). A voice and distractor discrimination machine learning-based model and/or its libraries of voiced sound signal patterns, non-voiced sound signal patterns, noise patterns, etc. may be stored in a cloud system and shared among a plurality of users of headwear devices described herein to further enhance the accuracy and efficiency of voice and distractor discriminations.

The user voice/distractor discriminator 122 outputs the digital user voice stream 132 to the speech recognition engine 46 for interpretation of the digital user voice stream 126 into speech, e.g., commands issued by the user 12, and outputs the digital distractor voice stream 134 to other processors for other functions.

Figure 8:
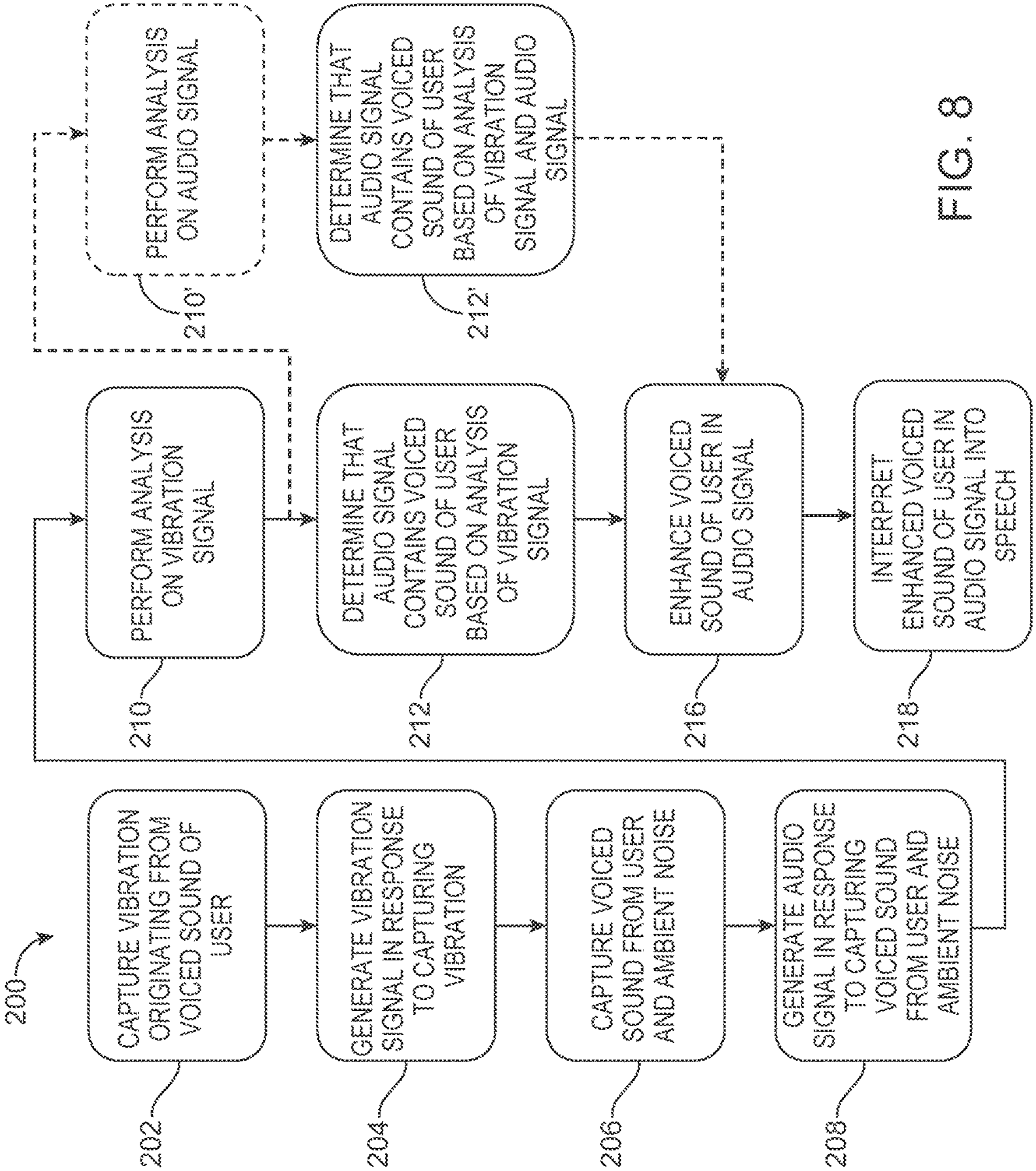
FIG. 8 is a flow diagram illustrating one method of operating a user speech subsystem of the virtual image generation system of FIG. 1.

Having described the structure and functionality of the user speech subsystem 22, one method 200 of operating the user speech subsystem 22 will now be described with respect to FIG. 8.

First, vibration 98 originating from a voiced sound of the user 12 is captured (e.g., via the VVPU sensor 42) (step 202), a vibration signal 102 is generated in response to capturing the vibration (step 204), voiced sound from the user 12 and ambient noise 92 is captured (e.g., via the microphone array 36) (step 206), and an audio signal 96 is generated in response to the capturing the voiced sound of the user 12 (step 208).

Next, an analysis is performed on the vibration signal 102 (e.g., by determining that one or more characteristics of the vibration signal 102 exceeds a threshold level) (step 210), and then it is determined that the audio signal 96 contains the voiced sound of the user 12 based on the analysis (step 212). Optionally, an analysis is also performed on the audio signal 96 (step 212'), in which case the determination that the audio signal 96 contains the voiced sound of the user 12 is based on the analyses of both the audio signal 96 and the vibration signal 100 (step 214'). For example, a relationship (e.g., a correlation between frequencies of spectra of the audio signal 96 and vibration signal 100) between the audio signal 96 and vibration signal 102 may be determined.

Next, the voiced sound of the user 12 in the audio signal 96 is enhanced (step 216). In one method, the voiced sound of the user 12 in the audio signal 96 may be enhanced only in response to the determination that the audio signal 96 contains the voiced sound of the user 12. In another method, the noise level of the audio signal 96 may be determined and compared to a threshold limit, and the audio signal 96 may be enhanced only when the determined noise level is greater than the threshold limit. In still another method, the vibration signal 102 may be used to enhance the voiced sound of the user 12 in the audio signal 96. Lastly, the enhanced voiced sound of the user 12 is interpreted into speech, e.g., into commands (e.g., via the speech recognition engine 46) (step 218).

Figure 9:
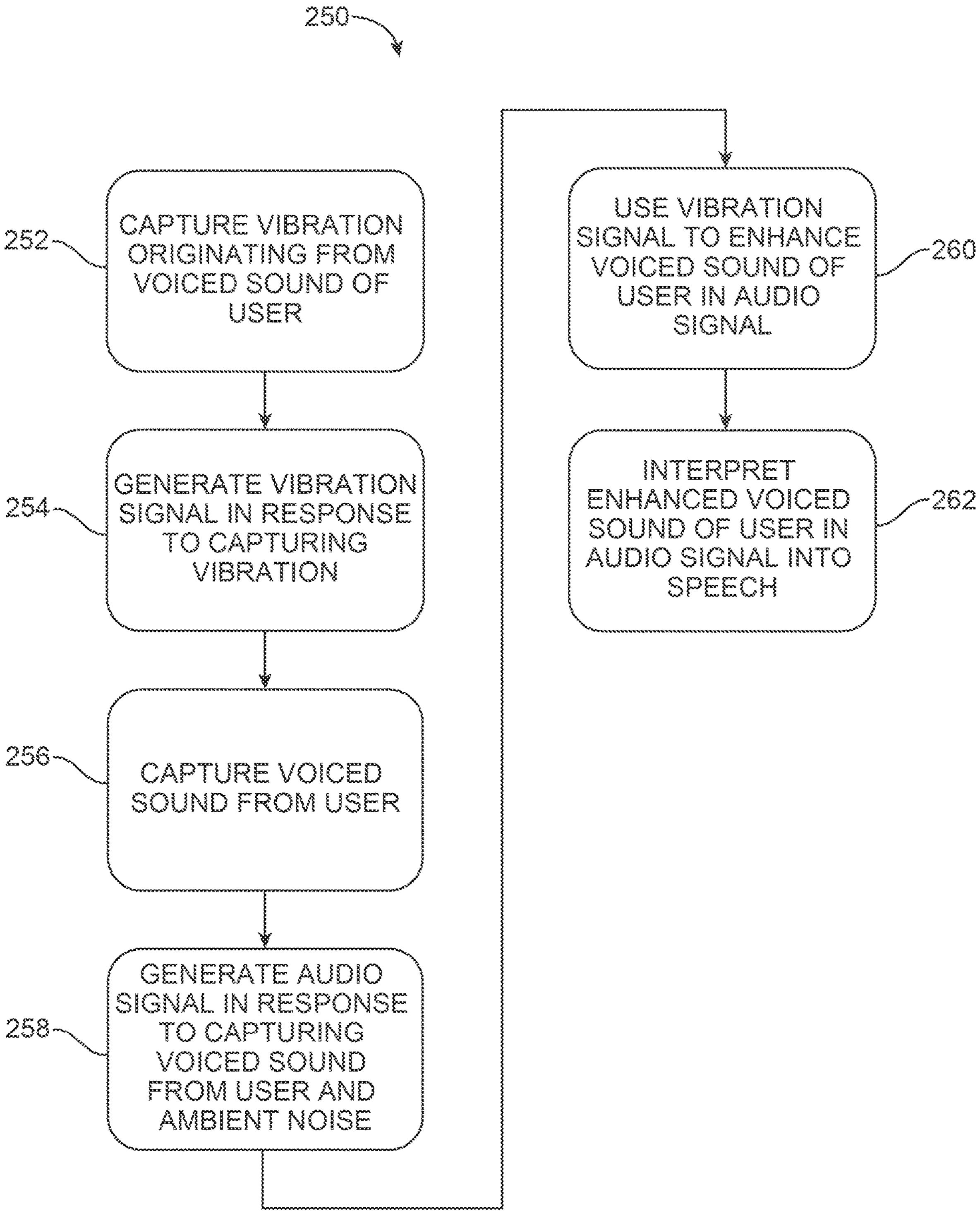
FIG. 9 is a flow diagram illustrating another method of operating a user speech subsystem of the virtual image generation system of FIG. 1.

Referring now to FIG. 9, another method 250 of operating the user speech subsystem 22 will be described.

First, vibration 98 originating from a voiced sound of the user 12 is captured (e.g., via the VVPU sensor 42) (step 252), a vibration signal 102 is generated in response to capturing the vibration (step 254), voiced sound from the user 12 and ambient noise 92 is captured (e.g., via the microphone array 36) (step 256), and an audio signal 96 is generated in response to the capturing the voiced sound of the user 12 (step 258).

Next, the vibration signal 102 is used to enhance the voiced sound of the user 12 in the audio signal 96 (step 260). For example, at least a portion of the vibration signal 102 may be combined with the audio signal 96, e.g., by spectrally mixing the audio signal 96 and the vibration signal 102. As another example, a pitch of the voiced sound of the user 12 may be estimated from the vibration signal 102, which estimated pitch may then be used to enhance the voiced sound of the user 12 in the audio signal 96. In one method, the voiced sound of the user 12 in the audio signal 96 may be enhanced only in response to the determination that the audio signal 96 contains the voiced sound of the user 12. In another method, the noise level of the audio signal 96 may be determined and compared to a threshold limit, and the audio signal 96 may be enhanced only when the determined noise level is greater than the threshold limit. Lastly, the enhanced voiced sound of the user 12 is interpreted into speech, e.g., into commands (e.g., via the speech recognition engine 46) (step 262).

Figure 10:
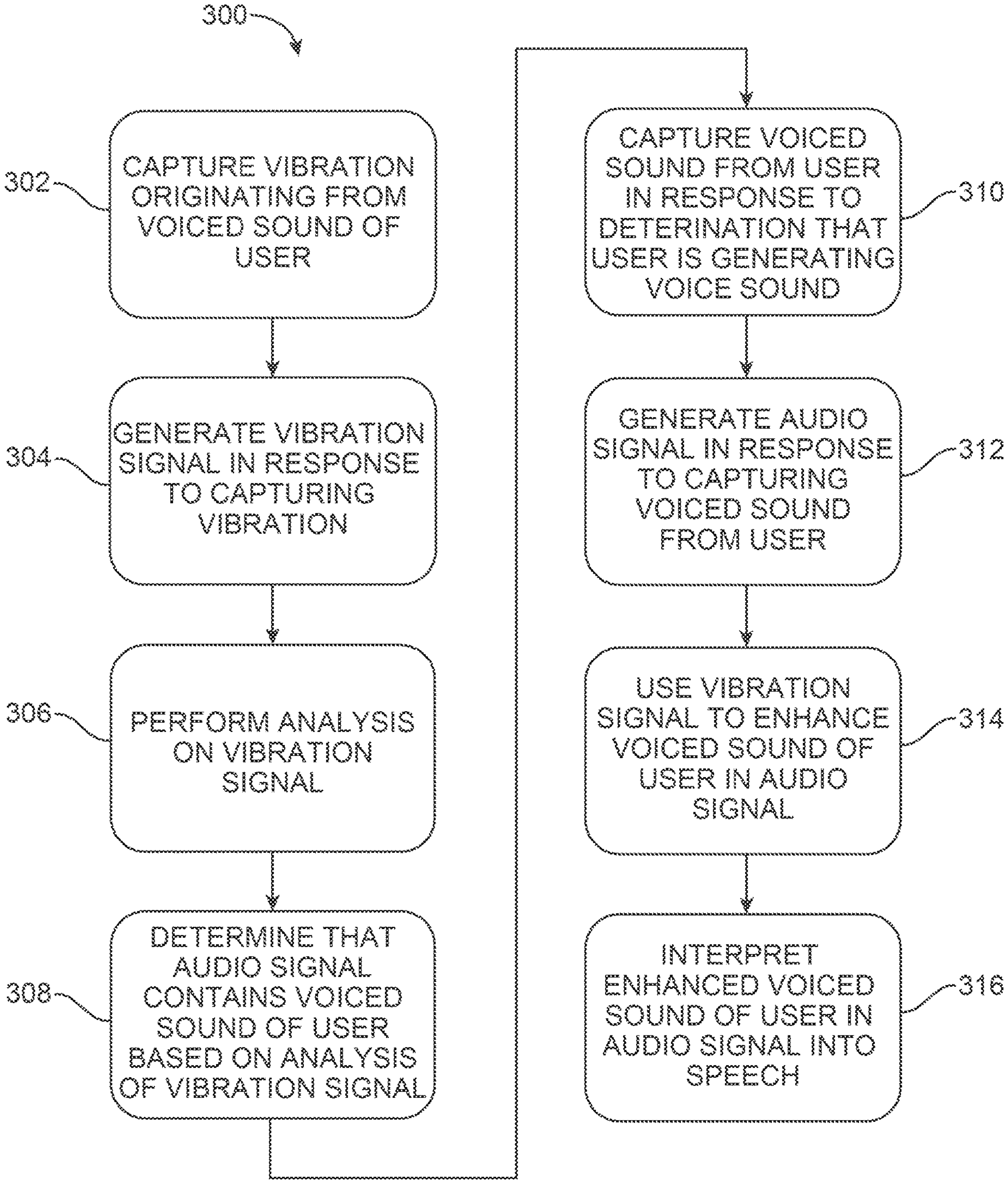
FIG. 10 is a flow diagram illustrating still another method of operating a user speech subsystem of the virtual image generation system of FIG. 1.

Referring now to FIG. 10, still another method 300 of operating the user speech subsystem 22 will be described.

First, vibration 98 originating from a voiced sound of the user 12 is captured (e.g., via the VVPU sensor 42) (step 302), and a vibration signal 102 is generated in response to capturing the vibration (step 304). Next, an analysis is performed on the vibration signal 102 (e.g., by determining that one or more characteristics of the vibration signal 102 exceeds a threshold level) (step 306), and then it is determined that the user 12 is generating voiced sound based on the analysis (step 308).

Then, the voiced sound from the user 12 is captured (e.g., via the microphone array 36) in response to the determination that the user 12 is generating voiced sound (step 310), and an audio signal 96 is generated in response to the capturing the voiced sound of the user 12 (step 312).

Next, the voiced sound of the user 12 in the audio signal 96 is enhanced (step 314). In one method, the voiced sound of the user 12 in the audio signal 96 may be enhanced only in response to the determination that the audio signal 96 contains the voiced sound of the user 12. In another method, the noise level of the audio signal 96 may be determined and compared to a threshold limit, and the audio signal 96 may be enhanced only when the determined noise level is greater than the threshold limit. In still another method, the vibration signal 102 may be used to enhance the voiced sound of the user 12 in the audio signal 96. Lastly, the enhanced voiced sound of the user 12 is interpreted into speech, e.g., into commands (e.g., via the speech recognition engine 46) (step 316).

Figure 11:
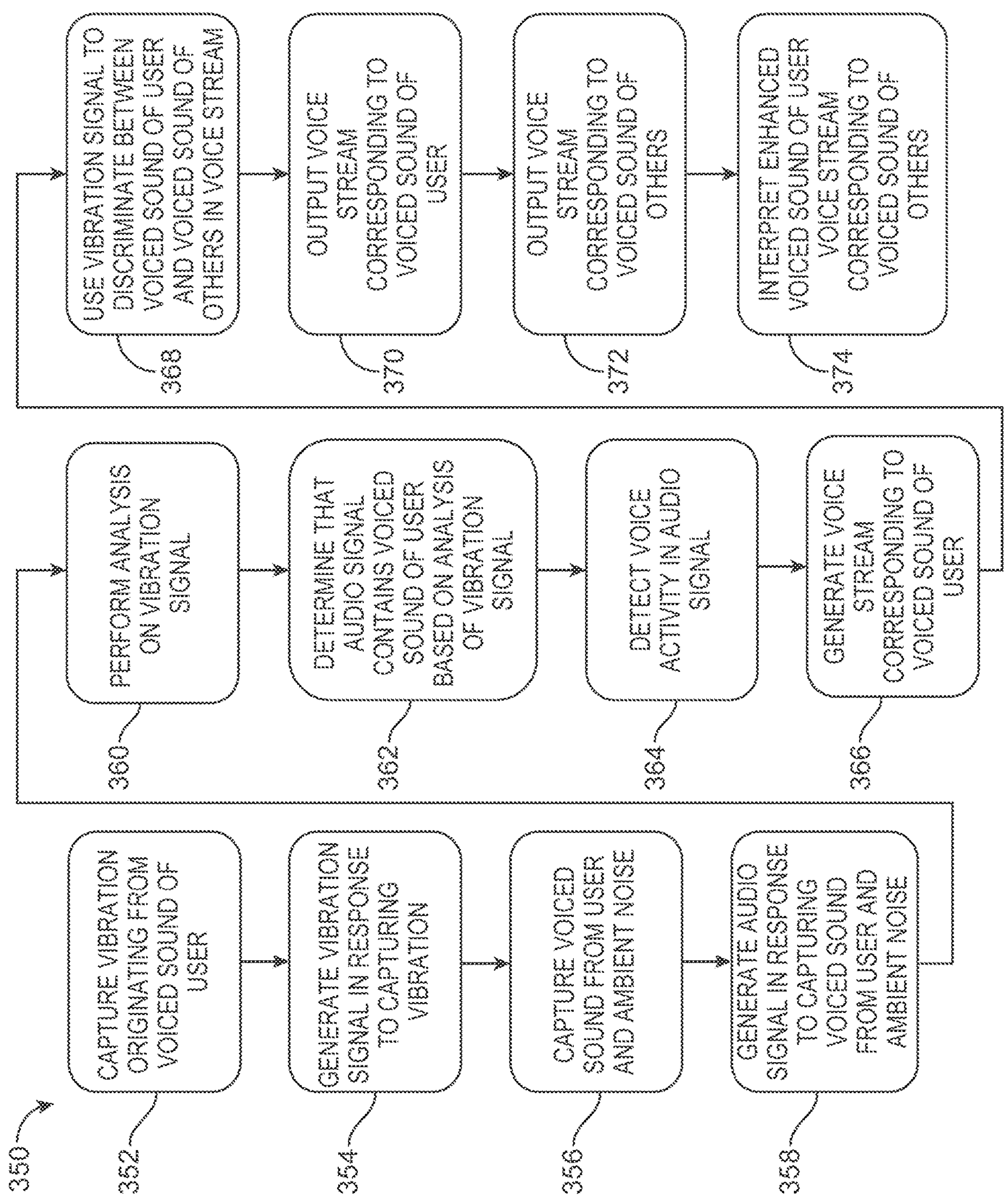
FIG. 11 is a flow diagram illustrating yet another method of operating a user speech subsystem of the virtual image generation system of FIG. 1.

Referring now to FIG. 11, yet another method 350 of operating the user speech subsystem 22 will be described.

First, vibration 98 originating from a voiced sound of the user 12 is captured (e.g., via the VVPU sensor 42) (step 352), a vibration signal 102 is generated in response to capturing the vibration (step 354), voiced sound from the user 12 and ambient noise contained voice sound from others 92 is captured (e.g., via the microphone array 36) (step 356), and an audio signal 96 is generated in response to the capturing the voiced sound of the user 12 (step 358). Next, an analysis is performed on the vibration signal 102 (e.g., by determining that one or more characteristics of the vibration signal 102 exceeds a threshold level) (step 360), and then it is determined that the audio signal 96 contains the voiced sound of the user 12 based on the analysis (step 362). Next, voice activity are detected in audio signal 96 (step 364), a voice stream 130 corresponding to the voiced sound of the user 12 and the voiced sound of others is generated (step 366), the vibration signal 102 is used to discriminate between the voiced sound of the user 12 and the voiced sound of the others in the voice stream 130 (step 368), a voice stream 132 corresponding to the voiced sound of the user 12 is output (step 370), and a voice stream 134 corresponding to the voiced sound of the others is output (step 372). In one method, steps 364-372 are only performed in response to the determination that the user 12 has generated voice sound. Lastly, the voiced sound of the user 12 in the voice stream 132 corresponding to the voiced sound of the user 12 is interpreted into speech, e.g., into commands (e.g., via the speech recognition engine 46) (step 374).

In the description above, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with virtual reality (VR), augmented reality (AR), mixed reality (MR), and extended reality (XR) systems have not been shown or described in detail to avoid unnecessarily obscuring descriptions of the embodiments. It shall be note that the terms virtual reality (VR), augmented reality (AR), mixed reality (MR), and extended reality (XR) may be used interchangeably in the present disclosure to denote a method or system for displaying at least virtual contents to a user via at least the virtual image generation system 10 described above. In the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A user speech subsystem, comprising:

a vibration voice pickup (VVPU) sensor which, when activated, captures vibration originating from first voiced sound of a user and generates a vibration signal; and at least one processor which, when activated, acquires the vibration signal and performs a set of acts, the set of acts comprising:

acquiring an audio signal output by at least one microphone in response to capturing the first voiced sound from the user and ambient noise comprising second voiced sound of one or more other persons, and discriminating, based at least in part upon the vibration signal, between the first voiced sound of the user and the second voiced sound from the one or more other persons in the audio signal captured by the at least one microphone;

enhancing the audio signal into an enhanced audio signal at least by replacing or combining at least a portion of the audio signal with at least a portion of the vibration signal.

2. The user speech subsystem of claim 1, wherein the at least one processor performs the set of acts, and the set of acts further comprises:

performing an analysis of the vibration signal, and determining that the at least one microphone has captured the first voiced sound of the user based at least in part upon on the analysis of the vibration signal; and discriminating between the first voiced sound of the user in the audio signal and the second voiced sound from the one or more other persons captured by the at least one microphone in response to a determination that the at least one microphone has captured the first voiced sound of the user.

3. The user speech subsystem of claim 1, wherein the at least one processor, when activated, performs the set of acts, and the set of acts further comprising:

discriminating-between the first voiced sound of the user and the second voiced sound from the one or more other persons captured by the at least one microphone at least by detecting voice activity in the audio signal;

generating a voice stream corresponding to the first voiced sound of the user and the second voiced sound of the one or more other persons; and discriminating between the first voiced sound of the user and the second voiced sound of the one or more other persons in the voice stream.

4. The user speech subsystem of claim 3, wherein the set of acts further comprises outputting the voice stream corresponding to the first voiced sound of the user.

5. The user speech subsystem of claim 3, wherein the set of acts further comprises outputting the voice stream corresponding to the second voiced sound of the one or more other persons.

6. The user speech subsystem of claim 4, further comprising a speech recognition engine which, when activated, processes enhanced voiced sound of the user in the voice stream into speech.

7. A system, comprising:

a frame structure characterized by being wearable on a head of a user; and the user speech subsystem of claim 1, wherein the VVPU sensor and the at least one microphone are affixed to the frame structure.

8. The system of claim 7, further comprising at least one speaker affixed to the frame structure, the at least one speaker, when activated, conveys sound to the user.

9. The system of claim 7, further comprising at least one display screen and at least one projection assembly that are affixed to the frame structure, the at least one projection assembly, when activated, projecting virtual content onto the at least one display screen for viewing by the user.

10. The system of claim 7, wherein the VVPU is vibrationally coupled to one of a nose, an eyebrow, and a temple of the user wearing the frame structure.

11. The system of claim 7, wherein the frame structure comprises a nose pad in which the VVPU sensor is affixed.

12. A method, comprising:

capturing vibration originating from first voiced sound of a user;

generating a vibration signal in response to capturing the vibration originating from the first voice sound of the user;

capturing the first voiced sound of the user and ambient noise;

generating an audio signal in response to capturing the first voiced sound of the user and the ambient noise;

discriminating between the first voiced sound of the user in the audio signal and second voiced sound from one or more other persons in the audio signal based at least in part upon the vibration signal; and enhancing the audio signal into an enhanced audio signal at least by replacing or combining at least a portion of the audio signal with at least a portion of the vibration signal.

13. The method of claim 12, performing an analysis on the vibration signal; and determining that the user has generated the first voiced sound based at least in part on the analysis on the vibration signal, wherein the first voiced sound of the user in the audio signal and the second voiced sound from the one or more other persons in the audio signal are discriminated in response to a determination that the user has generated the first voiced sound.

14. The method of claim 12, wherein discriminating between the first voiced sound of the user in the audio signal and the second voiced sound from the one or more other persons in the audio signal comprises:

detecting voice activity in the audio signal;

generating a voice stream corresponding to the first voiced sound of the user and the second voiced sound of the one or more other persons; and discriminating between the first voiced sound of the user and the second voiced sound of the one or more other users in the voice stream.

15. The method of claim 12, further comprising outputting a first voice stream corresponding to the first voiced sound of the user.

16. The method of claim 15, further comprising outputting a second voice stream corresponding to the second voiced sound of the one or more other persons.

17. The method of claim 15, further comprising interpreting enhanced voiced sound of the user in the first voice stream into speech.

18. A headwear device, comprising:

a frame structure that is characterized by being wearable on the head of a user;

a vibration voice pickup (VVPU) sensor affixed to the frame structure, the VVPU sensor that, when activated, captures vibration originating from first voiced sound of a user and generates a vibration signal;

at least one microphone affixed to the frame structure, the at least one microphone, when activated, captures the first voiced sound from the user and ambient noise comprising second voiced sound from one or more other persons;

at least one processor, when activated, performs a set of acts, the set of acts comprising:

performing an analysis on the vibration signal;

determining that the user has generated the first voice sound based at least in part on the analysis of the vibration signal;

discriminating, based at least in part upon the vibration signal, between the first voiced sound from the user and the second voiced sound from the one or more other persons; and enhancing the audio signal into an enhanced audio signal at least by replacing or combining at least a portion of the audio signal with at least a portion of the vibration signal.

19. The headwear device of claim 18, wherein performing the analysis on the vibration signal comprises determining that one or more characteristics of the vibration signal exceeds a threshold level.

20. The headwear device of claim 18, wherein the at least one processor performs the set of acts, and the set of acts further comprises:

performing a separate analysis on the audio signal; and determining that the at least one microphone has captured the first voiced sound from the user based at least in part on the analysis on the audio signal and the separate analysis on the vibration signal.

* * * * *